US008423572B2

(12) United States Patent
Boyce

(10) Patent No.: US 8,423,572 B2
(45) Date of Patent: *Apr. 16, 2013

(54) FAST IDENTIFICATION OF COMPLEX STRINGS IN A DATA STREAM

(75) Inventor: Kevin Gerard Boyce, Chelsea (CA)

(73) Assignee: Trend Micro Incorporated, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/371,455

(22) Filed: Feb. 12, 2012

(65) Prior Publication Data

US 2012/0143884 A1    Jun. 7, 2012

Related U.S. Application Data

(60) Continuation of application No. 13/270,632, filed on Oct. 11, 2011, now Pat. No. 8,117,229, which is a continuation of application No. 13/155,212, filed on Jun. 7, 2011, now Pat. No. 8,069,183, which is a continuation of application No. 13/011,395, filed on Jan. 21, 2011, now Pat. No. 7,987,196, which is a continuation of application No. 12/605,357, filed on Oct. 25, 2009, now Pat. No. 7,899,842, which is a division of application No. 11/678,587, filed on Feb. 24, 2007, now Pat. No. 7,630,982.

(51) Int. Cl.
*G06F 17/30* (2006.01)
*G06F 17/00* (2006.01)

(52) U.S. Cl.
USPC ............................ 707/780; 707/755; 707/756

(58) Field of Classification Search ........................ None
See application file for complete search history.

(56) References Cited

U.S. PATENT DOCUMENTS

| 5,299,206 | A | 3/1994 | Beaverson et al. | |
|---|---|---|---|---|
| 5,388,234 | A * | 2/1995 | Kanno et al. | ................... 711/220 |
| 5,471,610 | A | 11/1995 | Kawaguchi et al. | |
| 5,712,971 | A | 1/1998 | Stanfill et al. | |
| 6,278,992 | B1 | 8/2001 | Curtis et al. | |
| 6,282,532 | B1 | 8/2001 | Sandell | |
| 6,741,985 | B2 * | 5/2004 | Green | ........................... 707/742 |
| 6,785,677 | B1 | 8/2004 | Fritchman | |
| 6,856,981 | B2 | 2/2005 | Wyschogrod et al. | |

(Continued)

OTHER PUBLICATIONS

Eugene Agichtein, Venkatesh Ganti "Mining Reference Tables for Automatic Text Segmentation", 2004 ACM.*

(Continued)

*Primary Examiner* — Polina Peach
(74) *Attorney, Agent, or Firm* — IP-MEX Inc.; Victoria Donnelly

(57) ABSTRACT

An apparatus for detecting presence of a selected complex string in a data stream has a primary processor, detecting coherent strings of the selected complex string; and a secondary processor, pipelined to the primary processor, and detecting ambiguous strings interleaving said coherent strings. The primary processor is configured to determine a number of coherent strings in the selected complex string, each coherent string preceded by a prefix of indefinite characters, with a last coherent string succeeded by a suffix of indefinite characters; and to locate sequential portions of the data stream that are identical to successive coherent strings of the selected complex string. The secondary processor is configured to ascertain congruence of portions of the data stream preceding and interleaving the sequential portions to prefixes of the coherent strings; and to ascertain congruence of the suffix to a corresponding portion of said data stream following the sequential portions.

19 Claims, 29 Drawing Sheets

U.S. PATENT DOCUMENTS

| | | | |
|---|---|---|---|
| 6,892,237 B1 | 5/2005 | Gai et al. | |
| 6,952,694 B2 | 10/2005 | Mathur et al. | |
| 7,082,044 B2 | 7/2006 | Gould et al. | |
| 7,134,143 B2 | 11/2006 | Stellenberg et al. | |
| 7,225,188 B1 | 5/2007 | Gai et al. | |
| 7,254,632 B2 * | 8/2007 | Zeira et al. | 709/224 |
| 7,260,558 B1 | 8/2007 | Cheng | |
| 7,308,561 B2 | 12/2007 | Cornet et al. | |
| 7,325,013 B2 | 1/2008 | Caruso | |
| 7,383,268 B2 | 6/2008 | Krokosz | |
| 7,406,470 B2 * | 7/2008 | Mathur et al. | 1/1 |
| 7,454,418 B1 | 11/2008 | Wang | |
| 7,508,985 B2 * | 3/2009 | Van Lunteren | 382/181 |
| 7,529,746 B2 * | 5/2009 | Ichiriu et al. | 1/1 |
| 7,783,654 B1 * | 8/2010 | Sreenath | 707/758 |
| 7,784,094 B2 | 8/2010 | Balakrishnan et al. | |
| 7,818,311 B2 | 10/2010 | Michailov | |
| 7,860,881 B2 | 12/2010 | Haselden et al. | |
| 7,861,304 B1 | 12/2010 | Nachenberg | |
| 7,872,890 B1 | 1/2011 | Starovoitov et al. | |
| 7,945,527 B2 | 5/2011 | Michelin | |
| 7,958,164 B2 | 6/2011 | Ivanov et al. | |
| 8,326,819 B2 * | 12/2012 | Indeck et al. | 707/711 |
| 2005/0120017 A1 * | 6/2005 | Motoki | 707/5 |
| 2005/0273450 A1 | 12/2005 | McMillen et al. | |
| 2006/0020595 A1 * | 1/2006 | Norton et al. | 707/6 |
| 2006/0235845 A1 * | 10/2006 | Argentar | 707/6 |
| 2007/0127482 A1 * | 6/2007 | Harris et al. | 370/392 |
| 2007/0214134 A1 | 9/2007 | Haselden et al. | |
| 2008/0071781 A1 * | 3/2008 | Ninan et al. | 707/6 |

OTHER PUBLICATIONS

Ricardo Baeza-Yates, Gonzalo Navarro "New and Faster Filters for Multiple Approximate String Matching" Random Structures and Algorithms (RSA), vol. 20, No. I, Jan. 2002, pp. 23-49.*

Alicherry M., Muthuprasanna M., Kumar V. "High Speed Pattern Matching for Network IDS/IPS" Lucent Bell Laboratories; IEEE, 2006.

Efficient String Matching: An Aid to Bibliographic Search, by A.V. Aho and M.J. Corasick, Communication of the ACM, Jun. 1975, v.18, No. 6, p. 333-340.

A New Approach to Text Searching, by R.A. Baeza-Yates and G.H. Connet, Communication of the ACM, 35, Oct. 1992, p. 74-82.

Regular Expression Search Algorithm, by Ken Thompaon, Communications of the ACM, Jun. 1968, v.11, No. 6, p. 419-422.

Gonzalo Navarro, Mathieu Raffinot Practical and flexible pattern matching over Ziv-Lempel compressed text Journal of Discrete Algorithms 2 (2004) 347-371 www.elsevier.com/locate/jda2 Feb. 2004.

Gonzalo Navarro, Takuya Kida, Masayuki Takeda, Ayumi Shinohara, Setsuo Arikawa Faster Approximate String Matching over Compressed Text IEEE 2001.

Xu Kefu, Qi Deyu, Qian Zhengping, Zheng Weiping "Fast Dynamic Pattern Matching for Deep Packet Inspection" 2007 IEEE.

* cited by examiner

| Characters | Class |
|---|---|
| Any (don't care) | 0 |
| Digits 0 to 9 | 1 |
| A B C D | 2 |
| U V W X Y | 3 |
| ^ # $ @ & | 4 |
| ⋮ | |

*FIG. 3*

| | 2622 Prefix | 2620 Simple String | 2624 Suffix |
|---|---|---|---|
| 00 | ************ | William Harper | ******* |
| 01 | ******* | James Wilkinson | ** |
| 02 | ******* | Larry Davidson | ** |
| 03 | ************ | James Fitzgerald | **** |
| 04 | ******** | Kevin** Wilkinson | |
| 05 | ***** | Tracey** Wilkinson | |
| 06 | ****** | William** Wilkinson | |
| 07 | **** | Tracey Susan Davidson | **** |
| 08 | ***** | James** Kevin Fitzgerald | |

2740 bitmask: (16 rows × 40 columns of 0s)

FIG. 27

| 2622 Prefix | 2620 Simple String | 2624 Suffix | 2740 bitmask |
|---|---|---|---|
| 09 | ********* Victoria Fitzgerald | **** | 0000000000000000000000000000000000000000000000000000 |
| 10 | **** James** Kevin | | 0000000000000000000000000000000000000000000000000000 |
| | **** Davidson | **** | 0000000000000000000000000000000000000000000000000000 |
| 11 | **** William** Budd | | 0000000000000000000000000000000000000000000000000000 |
| | **** Davidson | | 0000000000000000000000000000000000000000000000000000 |
| 12 | *** Kevin** Larry | | 0000000000000000000000000000000000000000000000000000 |
| | ******** Harper | **** | 0000000000000000000000000000000000000000000000000000 |
| 13 | *** James** Larry | | 0000000000000000000000000000000000000000000000000000 |
| | *** Fitzgerald | ****** | 0000000000000000000000000000000000000000000000000000 |
| 14 | * Tracey Victoria | | 0000000000000000000000000000000000000000000000000000 |
| | **** Wilkinson | **** | 0000000000000000000000000000000000000000000000000000 |
| 15 | * James James | | 0000000000000000000000000000000000000000000000000000 |
| | * Wilkinson | ********** | 0000000000000000000000000000000000000000000000000000 |

*FIG. 28*

FAST IDENTIFICATION OF COMPLEX STRINGS IN A DATA STREAM

RELATED APPLICATIONS

The present application is a Continuation of U.S. patent application Ser. No. 13/270,632 filed on Oct. 11, 2011, which has issued as a U.S. Pat. No. 8,117,229 on Feb. 14, 2012;

which in turn is a Continuation of application Ser. No. 13/155,212 filed on Jun. 7, 2011, which has issued as a U.S. Pat. No. 8,069,183 on Nov. 29, 2011;

which in turn is a Continuation of U.S. patent application Ser. No. 13/011,395 filed on Jan. 21, 2011, which has issued as a U.S. Pat. No. 7,987,196 on Jul. 26, 2011;

which in turn is a Continuation of U.S. patent application Ser. No. 12/605,357 filed on Oct. 25, 2009, which has issued as a U.S. Pat. No. 7,899,842 on Mar. 1, 2011;

which in turn is a Divisional from the parent U.S. application Ser. No. 11/678,587 filed on Feb. 24, 2007 to Boyce entitled "Fast identification of Complex Strings in a Data Stream", which has issued as a U.S. Pat. No. 7,630,982 on Dec. 8, 2009;

the entire contents of the above noted applications being incorporated herein by reference.

FIELD OF THE INVENTION

The present invention relates to detection of complex strings in a data stream.

BACKGROUND

Fast search techniques are needed in many computing and network applications such as search engines and network addressing. Regular search of a string in a dictionary of strings of fixed sizes is rather simple, using for example binary search. With a dictionary of variable-size strings, the matching process becomes more intricate. A string of arbitrary size in which each character is uniquely defined in an alphabet is colloquially called an "exact string". A string of arbitrary size in which at least one character may be replaced without changing the purpose of the string is colloquially called an "inexact string". The search for an inexact string is complicated. For example searching for a name such as "John Winston Armstrong" in a dictionary of names is much simpler than searching for any name in the dictionary that contains a string such as "J . . . ton.Arm", where '.' may represent any of a subset of characters in the alphabet. In the latter, each of a large number of strings such as "Jane Clinton-Armbruster" and "Jack Newton Armstrong" is considered a successful match.

Numerous software-based techniques, suitable for implementation in a general-purpose computer, for fast matching of exact strings in which each character is uniquely defined and corresponds to a pre-defined alphabet are known. The Aho-Corasick algorithm, for example, is known to be computationally efficient and may be used in real-time applications, see, e.g., a paper by Alfred V. Aho and Margaret J. Corasick "Efficient String Matching: An Aid to Bibliographic Search" published in the Communications of the ACM, June 1975, Volume 18, Number 06, p. 333-340. Software-based techniques for matching "inexact strings" are also known, but are too slow for certain real-time applications such as network security applications which require fast execution, see, e.g., a paper by Ricardo A. Baeza-Yates and Gaston H. Connet "A New Approach to Text Searching" published in Communications of the ACM, 35, October 1992, p. 74-82.

Regular Expressions, as described, for example, in the paper written by Ken Thompson "Regular Expression Search Algorithm" published in Communications of the ACM, Vol. 11, Number 6, June 1968, p. 419-422 are commonly used for representing inexact strings. Regular expressions can be implemented efficiently using special-purpose hardware. However methods for efficient implementation of regular expressions in a general-purpose computer are yet to be developed. Software implementations of regular expressions either require a memory of extremely large size or execute in a non-bounded time which is a function of the number of such inexact strings to be considered, the complexity of the individual inexact strings, and input data to be examined.

One solution adopted in prior art is to use a two-stage algorithm where an algorithm for simple search, such as the Aho-Corasick algorithm, is used to efficiently find parts of packet data, which contain some part of the patterns of interest, and then a slower regular-expression-based algorithm is applied to a potentially lesser number of patterns to detect inexact patterns. Such a solution can handle a large variety of inexact patterns but has significant drawbacks including: (a) unpredictable computation effort to determine the existence, or otherwise, of a matching inexact string, the processing time being a function both of the data content and of the size and complexity of the patterns; (b) incomplete pattern identification where only a part of a pattern may be found without readily defining the boundaries of the pattern in an examined data stream—verifying a match with regular expressions may require access to a large amount of preceding data up to the possible start point, and may require waiting for data that has not yet been received; c) a requirement for post-processing to detect patterns in order of occurrence as neither the start nor end points may be known in advance, forcing ensemble matching and sorting.

Network intrusion detection and prevention is concerned with protecting computer systems from unintended or undesired network communications. A fundamental problem is in determining if packets in a data stream contain data strings of specific patterns (also called signatures) which are known to exploit software vulnerabilities in the computer systems. The number of such signatures of practical concern is very large and their structure is rapidly changing. Many of these signatures cannot practically be expressed as ordinary sequences of characters. For example a credit-card number uniquely identifies a specific credit card while a string comprising common digits of the numbers of all credit cards issued by one bank does not uniquely identify a specific credit card.

A string inserted in a data stream may be harmful to a recipient of the data stream and, hence, the need to locate the string to enable further corrective actions. Clearly, any means for detecting strings of special interest in a continuous data stream has to be sufficiently fast. One approach for fast detection is to devise special-purpose hardware circuitry with concurrent processing. However, considering the fast pace of network changes, a solution based on special-purpose hardware may be impractical.

A software solution is highly desirable because of its low cost, ease of deployment, and ease of adapting to the changing communications environment. There is therefore a need for a software-based algorithm that can detect a large set of strings under execution-time constraints and memory limitations in order to enhance Intrusion prevention systems (IPS) and intrusion detection systems (IDS).

SUMMARY

In accordance with one aspect, the present invention provides a method of examining a data stream to detect presence of at least one complex string belonging to a predefined complex dictionary. The method comprises steps of: associating an array of state variables and an array of reference states with the complex dictionary with one-to-one correspondence between entries of the complex dictionary, the array of state variables, and the array of reference states; detecting a simple string in the data stream, the simple string being a constituent simple string in each of at least one complex string in the complex dictionary; updating a state variable associated with the each of at least one complex string according to all relative positions of the simple string within the each of at least one complex string; and determining that the each of at least one complex string is present in the data stream when the state variable attains a corresponding reference state.

In one realization of the method, a multi-bit Boolean state variable is used. Consequently, the step of updating the state variable comprises steps of: (1) shifting bits of the Boolean state variable a number of positions determined according to a position of the simple string in the data stream and a previous position of any simple string detected in the data stream and belonging to the each of at least one complex string; (2) setting an end bit of the Boolean state to indicate logical TRUE; and (3) performing a logical AND of the state variable and a bitmask associated with the simple string, the bitmask indicating the all relative positions of the simple string within the each of at least one complex string.

The bitmask may originate at the rightmost bit and, consequently, the Boolean state variable is shifted in the direction from right to left with the rightmost bit of the Boolean variable set to equal TRUE. Alternatively, the bitmask may originate at the leftmost bit and, consequently, the Boolean state variable may be shifted in the direction from left to right with the leftmost bit of the Boolean variable set to equal TRUE.

The corresponding reference state indicates a specific relative position of a last character of a last simple string in each of the at least one complex string. In an exemplary realization, the corresponding reference state is a multi-bit Boolean constant having a bit corresponding to the specific relative position set to logical TRUE, and the presence of each of the at least one complex string in the data stream is determined by performing a logical AND of the state variable and the corresponding reference state, with the outcome overwriting a current value of the state variable. The bit in the state variable at a position corresponding to the specific relative position is then examined and if its state is TRUE, detection of a respective complex string may be ascertained subject to congruence of a suffix of the respective complex string to a corresponding portion of the data stream.

In accordance with another aspect, the present invention provides a method of detecting the presence of a selected complex string from a predefined complex dictionary in a data stream. The selected complex string comprises a predefined number $\chi>1$ of simple strings with each simple string having a prefix of indefinite characters. The last simple string of the complex string has a suffix of indefinite characters, which is considered a suffix of the complex string. The prefix of the first simple string may be a NULL string, and the suffix may be a NULL string. A NULL string is an empty string with zero characters. The method comprises steps of: locating a first portion of the data stream where the first portion is identical to a first simple string of the selected complex string; ascertaining congruence of an adjacent portion of the data stream, preceding the first portion, to a prefix of the first simple string; locating a second portion of the data stream where the second portion is identical to a second simple string of the selected complex string; and ascertaining congruence of an intervening portion between the first portion and the second portion to a prefix of the second simple string. Notably, congruence of a NULL string to any other NULL string is, by definition, ascertained.

The method includes a further step of ascertaining congruence of the suffix to a corresponding portion of the data stream determined according to a length of the complex string. Where the number of simple strings in a complex string exceeds 2, i.e., $\chi>2$, the method comprises further steps of locating an $m^{th}$ portion of the data stream is the $m^{th}$ portion being identical to an $m^{th}$ simple string of the selected complex string; and ascertaining congruence of an intervening portion, of the data stream, preceding the $m^{th}$ portion and a prefix of an $m^{th}$ simple string, the intervening portion following an $(m-1)^{th}$ portion of the data stream found to be identical to an $(m-1)^{th}$ simple string in the selected complex string.

In accordance with another aspect, the present invention provides a method of identifying a complex string in a data stream, the method comprising steps of: segmenting the complex string into a suffix and a set of string segments, each string segment comprising a prefix and a simple string, where the prefix comprises indefinite characters and the suffix comprises indefinite characters; generating an array of bitmasks each bitmask associated with a string segment in the set of string segments, the bitmask indicating a location index of an end character of the each string segment; associating a Boolean state variable with the complex string; locating a current simple-matching position in the data stream at which at least one simple-string belonging to the complex string terminates; initializing a current mask as an opaque mask; performing a logical OR operation of the current mask with selected bitmasks corresponding to the at least one simple string to produce a composite current mask; determining a gap between the current simple-matching position and a previous simple-matching position; left-shifting each entry of the state variable by the gap, replacing each shifted entry by "0" and setting the rightmost entry to "1"; and updating the state variable according to a logical AND operation with the composite current mask.

The method comprises a step of determining that a portion of the data stream terminating at the current simple-matching position contains the complex string when a bit in a target position of the state variable represents a logical TRUE, where the target position corresponds to a last location index of an end character of a last string segment within the complex string.

The method comprises a further step of associating a segment descriptor with each string segment. The segment descriptor indicates a length of the string segment and a length of a prefix of the string segment. A last string segment within the complex string further comprises indications of a length of the suffix and a target position corresponding to a last location index of an end character of a last string segment within the complex string. Each selected bitmask associated with a specific simple string satisfies a condition of congruence of a prefix of the specific simple string and a corresponding portion of the data stream. When the suffix includes at least one character, the method comprises a step of determining that a portion of the data stream terminating at a position of index equal to an index of the current simple-matching position plus a length of the suffix when the state variable contains a logical TRUE at the target position and the suffix is congruent with a portion of the data stream succeeding the current simple-matching position.

In accordance with a further aspect, the present invention provides a method of screening a data stream to detect presence of any complex string from a predefined complex dictionary. The method comprises a preprocessing step of transforming the complex dictionary into a segmented dictionary, an array of segment descriptors, and an array of bitmasks. The segmented dictionary comprises string segments of each complex string in the complex dictionary, each string segment comprising a prefix and a simple string. Each segment descriptor defines a content of a corresponding string segment in the segmented dictionary, and each bitmask indicates a location of a string segment in the segmented dictionary within a respective complex string in the complex dictionary. Steps for detecting and locating complex strings in the data stream include: performing a simple search to produce detected simple strings in the data stream, where the simple strings are defined in the segmented dictionary; selecting candidate string segments from among specific string segments containing the detected simple strings; and identifying candidate complex strings for the at least one complex string in the complex dictionary, where the candidate complex strings contain the candidate string segments, using the array of segment descriptors and the array of bitmasks.

The method further comprises: (1) associating a state variable with each complex string in the complex dictionary; (2) updating the state variable according to gauged spans between successive positions in the data stream, at which positions simple strings belonging to the each complex string terminate; (3) determining, at each position, a subset of the candidate string segments belonging to the each complex string; and (4) correlating the state variable with locations, within the each complex string, of candidate string segments of the subset. The step of correlating further comprises formulating a composite current mask as a logical OR function of bitmasks of candidate string segments of the subset, and performing a logical AND operation of the composite current mask and the state variable to produce an updated state variable. The step of selecting comprises a further step of ascertaining congruence of a portion of the data stream preceding each detected simple string to a prefix of a corresponding string segment from among the specific string segments.

In an exemplary embodiment, the present invention provides an article of manufacture comprising at least one processor-readable medium and instructions carried on the at least one medium. The instructions are devised to cause a processor to transform the complex dictionary into a structure which enables computationally efficient search. The structure comprises a segmented dictionary, an array of segment descriptors, and an array of bitmasks. The segmented dictionary comprises string segments of each complex string in the complex dictionary, and a suffix. Each string segment comprises a prefix and a simple string. Each segment descriptor defines content of a corresponding string segment in the segmented dictionary. Each bitmask indicates a location of a string segment in the segmented dictionary said string segment being within a respective complex string in the complex dictionary. The instructions are further devised to cause the processor to perform simple search to produce detected simple strings defined in the segmented dictionary, select candidate string segments from among specific string segments containing the detected simple strings, and identify candidate complex strings in the complex dictionary containing the candidate string segments using the array of segment descriptors, and the array of bitmasks. The instructions further causes the processor to ascertain congruence of the prefix of each string segment with a corresponding portion of the data stream and congruence of the suffix of each complex string with a corresponding portion of the data stream. Where the prefix is a NULL prefix, having zero characters, and where the suffix is a NULL suffix, congruence is inherently ascertained.

In an alternate realization of the article of manufacture, the segmented dictionary comprises a prefix and string segments of each complex string in the complex dictionary, with each string segment comprising a simple string and a suffix. The instructions cause the processor to operate to ascertain congruence of the prefix with a respective portion of the data stream and congruence of the suffix of the each string segment with a corresponding portion of the data stream.

BRIEF DESCRIPTION OF THE DRAWINGS

Embodiments of the present invention will be further described with reference to the accompanying exemplary drawings, in which:

FIG. 3 illustrates exemplary indefinite characters in the complex string of FIG. 2;

FIGS. 27 and 28 illustrate a bitmask-array comprising Boolean bitmasks each associated with a string segment in the segmented dictionary of FIG. 26.

TERMINOLOGY

Figure 1:
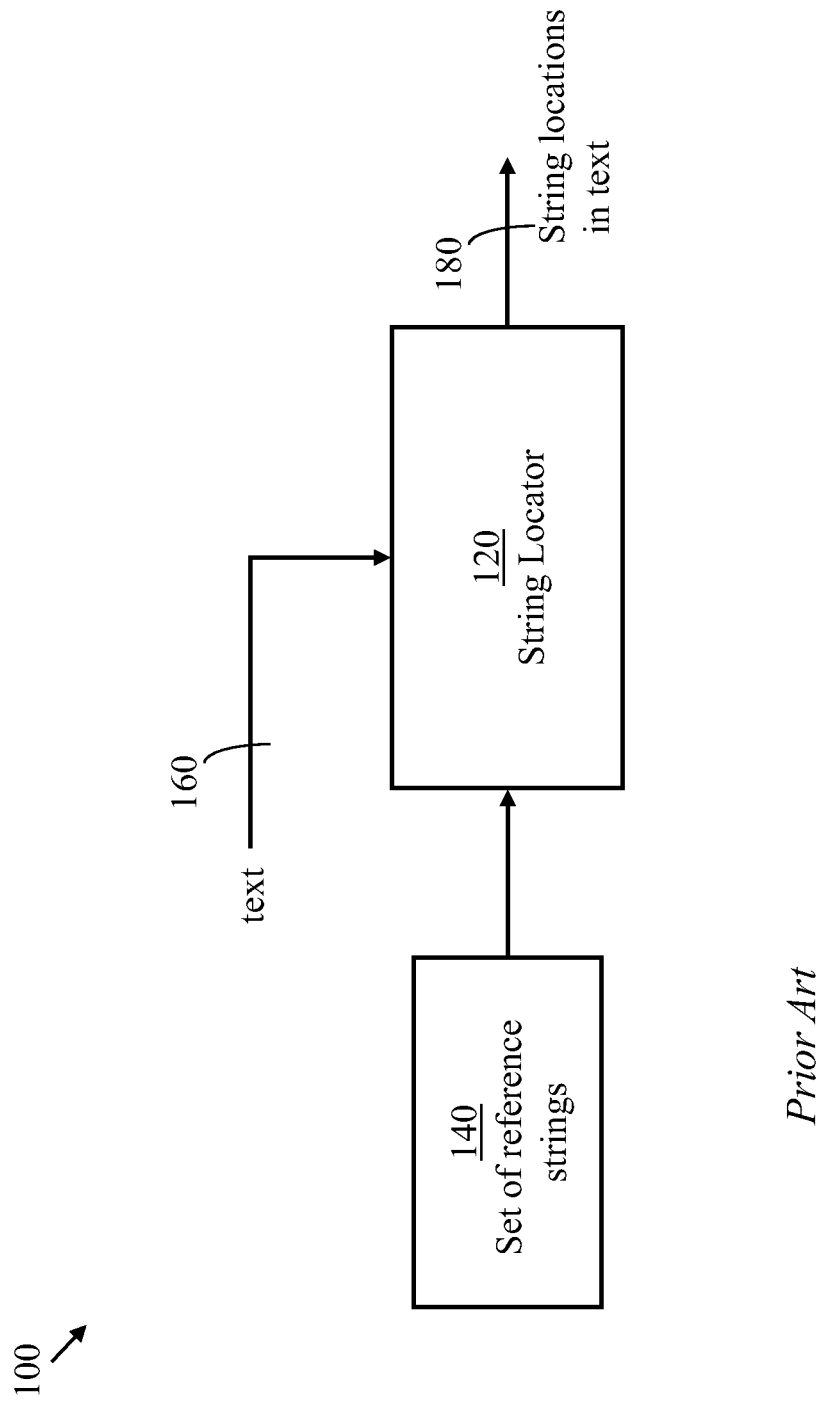
FIG. 1 illustrates a prior-art system for matching each of a set of reference strings with potential corresponding strings in a text.

Alphabet: The term alphabet refers to a set of characters which may include punctuation marks and spaces.

Class: A subset of characters may be selected to form an alphabet class. The selected subset of characters may be arranged in an arbitrary order. For brevity, the term "class" will be consistently used herein to refer to an alphabet class. Several classes may be formulated.

Indefinite character: An indefinite character is an ordinary character of the alphabet which derives the indefinite status from its position in a predefined string of characters. An indefinite character belongs to one of predefined classes and possibly to more than one class. One of the classes may encompass the entire alphabet, and a character belonging to such class is treated as a character with a "don't care" attribute.

Coherent word: A coherent word comprises a sequence of characters. It is a character-defined word in which each character is an ordinary character uniquely defined in the alphabet. If the alphabet includes punctuation marks and spaces, a group of coherent words may also be treated as a single coherent word.

Ambiguous word: An ambiguous word is a class-defined word in which each character is defined according to class association.

Simple string: A simple string comprises a coherent word. As described above, several coherent words separated by spaces may also constitute a single coherent word.

Ambiguous string: The term "ambiguous string" is herein used synonymously with the term "ambiguous word".

Complex string: A complex string comprises at least two words, of which at least one word is an ambiguous word and at least one ambiguous word is subject to at least one restriction such as a predefined number of characters or membership of constituent characters in specific classes.

Prefix: An ambiguous word preceding a simple string within a complex string is called a prefix.

Suffix: An ambiguous word succeeding a simple string within a complex string is called a suffix.

String segment: A string segment may comprise a prefix and immediately following simple string or a simple string and an immediately following suffix. Either of the two definitions may be adopted as long as it is used consistently.

String equality: Two strings are said to be equal, or equivalent, if they are identical.

String congruence: Two strings are said to be congruent if they have the same number of characters and if likewise positioned characters in the two strings belong to the same class. This applies to a pair of ambiguous strings or to a pair of complex strings.

String matching: Two simple strings (coherent strings) are said to be matching strings if they are equal. Two complex strings are said to be matching strings if there is one-to-one equality of their constituent coherent strings and one-to-one congruence of their constituent ambiguous strings.

Simple dictionary: A simple dictionary may be devised to include a set of simple strings of special interest. The simple dictionary may expand or shrink as the need arises.

Complex dictionary: A complex dictionary comprises a set of complex strings. A simple string may be treated as a reduced complex string and, therefore, the method of the invention will focus on complex strings. The set of complex strings may be updated to add new complex strings or delete existing complex strings.

Text: A text is a sequence of characters extracted from a data stream and may include ordinary characters and indefinite characters. A text may be examined to ascertain the existence of any of complex string from among a predefined set of reference complex strings forming a complex dictionary.

Mask: A mask is a sequence of bits, each bit assuming either of the two states "false" or "true". When a mask is ANDed with a first Boolean variable of equal length to produce a second Boolean variable, each bit of the second Boolean-variable at a position corresponding to a mask bit of false state (binary 0) is also of false state. Each bit of the second Boolean-variable at a position corresponding to a mask bit of true state (binary 1) has the same state of the corresponding bit of the first Boolean variable.

Opaque mask: A mask in which each bit represents logical FALSE, binary 0 for example, is an opaque mask.

State: The state of an n-bit Boolean state variable is indicated by bits set to represent logical TRUE (binary 1) and may be denoted $\{p_0, p_1, \ldots, p_n\}$, where $p_j$, $0 \leq j < n$, are positions in the state variable each having a value of binary 1. For example, a 32-bit Boolean state variable having a value of [00000000001000010000000000000001] may be represented as {0, 16, 21}, with the rightmost bit being the origin of index 0. A state variable having a null value, where all its bits are set to binary 0, is denoted { }.

String Length: The length of any string is the number of characters of the string, including indefinite characters.

DETAILED DESCRIPTION OF THE EMBODIMENTS

The method of the present invention, which applies to complex strings, is devised to reduce memory consumption, minimize the computation effort, reduce computation-time variance, and present detected complex strings in the order in which they are encountered in an examined data stream.

FIG. 1 illustrates a conventional string-search mechanism 100 where a string locator 120 receives a text 160 and attempts to find portions of the text that are listed in a set 140 of reference strings. The output 180 of the string locator includes locations in the text of each found string. The location information may then be used to produce a variety of reports depending on the application.

Figure 2:
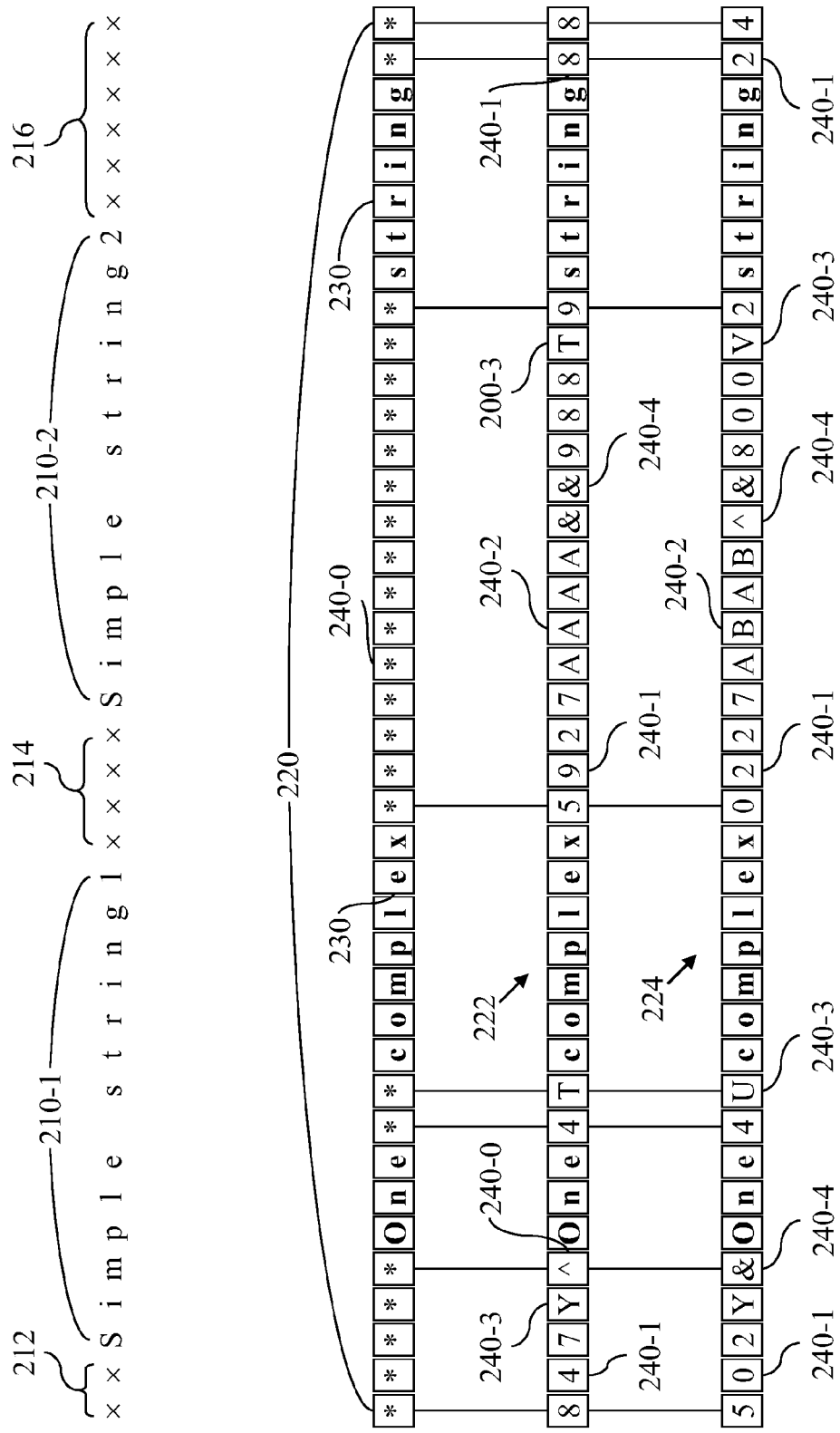
FIG. 2 illustrates an exemplary structure of a complex string for use in embodiments of the present application.

FIG. 2 illustrates a portion of a text including two successive independent simple strings "Simple String1" and "Simple String2", referenced as 210-1 and 210-2 respectively, which are found in the set 140 of reference strings. The string locator 120 identifies the two simple strings independently. The lengths and content of the preceding substring 212, the intervening substring 214, and the succeeding substring 216 are irrelevant.

FIG. 2 also illustrates a portion of a text which includes an exemplary complex string 220 that belongs to some complex dictionary. The complex string 220 includes three simple strings 230 with the content "One", "Complex", and "string". The content of the simple strings 230, together with the preceding, intervening, and succeeding substrings, collectively marked by successive occurrence of a virtual character '*' (a space holder), determine whether the complex string 220 is congruent with one of reference complex strings in some predefined complex dictionary. The use of the symbol "*" in any position in complex string 220 should be understood to indicate that an indefinite character may occupy the position. The indefinite character may be any of a predefined subset of characters, such as subsets {A, a, B, b}, {0, 1, 2, 3, 4, 5}, or {$, ^, *, +"}, the character * in the latter being an ACTUAL character *. Each indefinite character in complex strings 222 and 224 belongs to one of five classes defined in FIG. 3. A character belonging to class j, is identified as 240-j, $0 \leq j < 5$.

It is noted that a complex dictionary preferably includes only mutually distinct complex strings. However, as will be described below with reference to FIG. 25, the method of the invention is sufficiently flexible to accept a complex dictionary in which any of the reference complex strings may be replicated for whatever reason. It is further noted that a complex string may comprise multiple identical simple strings. A constituent simple string of any complex string may also be found in other complex strings in the same complex dictionary.

In one realization of complex string 220, each character "*" may indicate a logical "don't care" (a term used extensively in the art). Accordingly, a character "*" may correspond to any recognizable character in a recognized alphabet-list. With 24 such characters in the exemplary complex string 220, and considering a recognizable alphabet of 80 unique characters (comprising, for example, the upper-case and lower-case English characters, 10 single decimal digits, and 18 auxiliary symbols and punctuation marks), the number of simple strings that can be manufactured to be congruent with the exemplary complex string 220 is the astronomical $80^{24}$. Of course, considering grammatical constraints in both natural languages and computer-tailored languages, the number of likely encounters in a data stream of complex strings, congruent to the exemplary complex string 220, may be reduced significantly. However, the number would still be too large to list the likely congruent strings in a simple dictionary adapted for use with a conventional simple-search method.

In general, individual indefinite characters "*" in complex string 220 may belong to different classes each class being defined by a corresponding subset of the alphabet. Two complex strings 222 and 224, which may be encountered in a data stream contain identical simple strings in corresponding positions. The two complex strings, however, have different indefinite characters and the congruence, or otherwise, of the two strings is determined according to the class definition of the indefinite characters.

FIG. 3 illustrates an exemplary definition of five classes. The five classes are associated with class indicators 0 to 4. Class 0 encompasses all characters of the alphabet. Class 1 includes decimal digits 0 to 9. Class 2 includes upper-case characters A, B, C, and D. Class 3 includes upper-case characters U, V, W, X, and Y. Class 4 includes the symbols (herein also called characters) ^, #, $, @, and &. Many other classes may be defined. Based on the class definition of FIG. 3, the complex strings 222 and 224 of FIG. 2 are determined to be congruent because each decimal digit in complex-string 222 corresponds to a decimal digit (not necessarily equal) in a corresponding position in complex-string 224, each symbol of class 4 in complex-string 222 corresponds to a symbol of class 4 at a corresponding position in complex-string 224; and so on.

According to the method of the invention, a complex string is divided into string segments. By definition, a complex string contains a number of simple strings with intervening indefinite characters. The first constituent simple string may be preceded by indefinite characters, and the last constituent simple string may be succeeded by indefinite characters. The indefinite strings preceding a simple string is referenced as a "prefix" and the indefinite strings succeeding a simple string is referenced as a suffix. A prefix may have an arbitrary number, including zero, of characters. Likewise, a suffix may have an arbitrary number, including zero, of characters. A string segment may be defined as a concatenation of a prefix and a succeeding simple string or a concatenation of a simple string and succeeding suffix.

Figure 4:
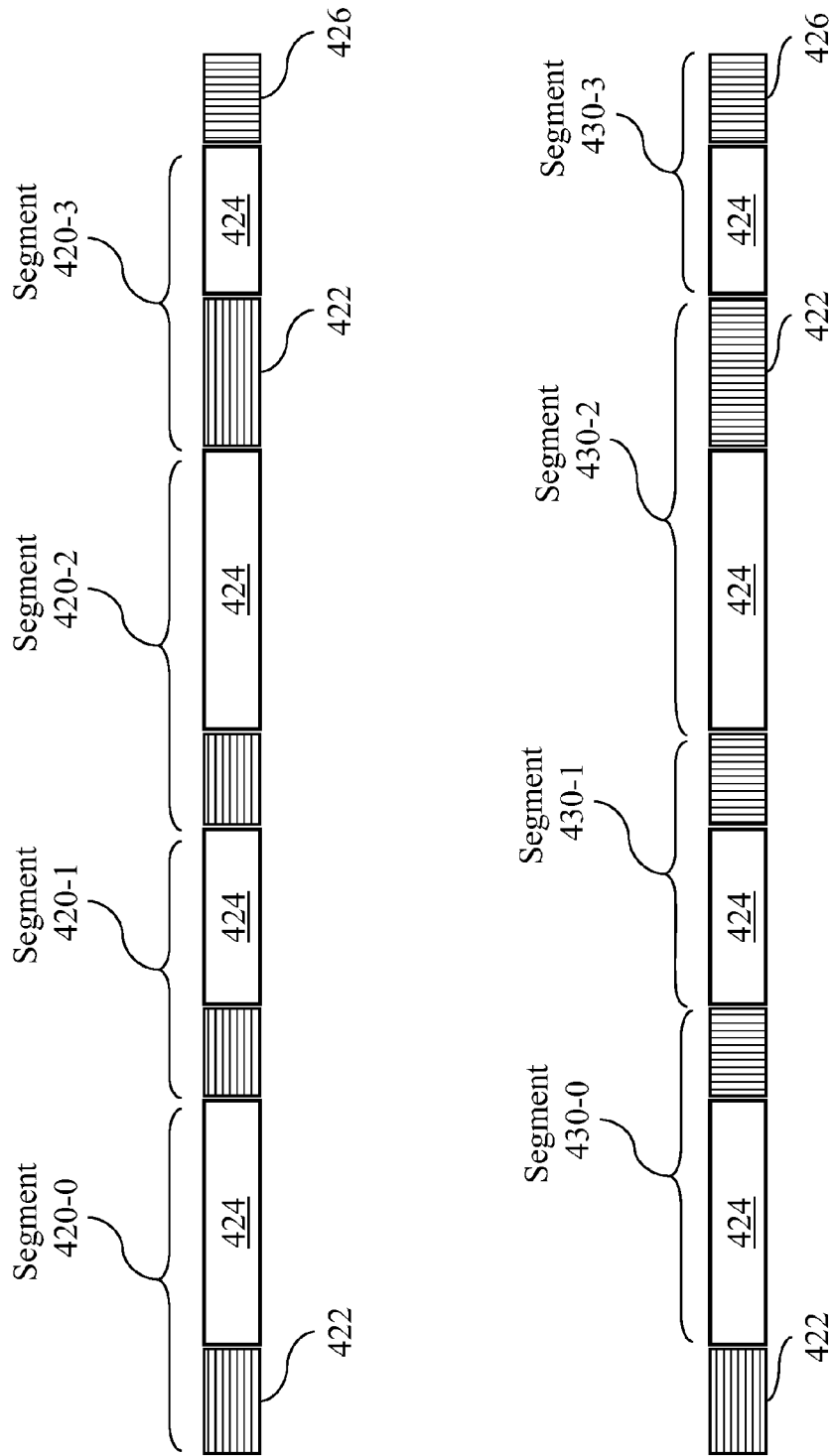
FIG. 4 illustrates alternate forms of segmented complex strings for use in embodiments of the present invention.

FIG. 4 illustrates two schemes for segmentation of a complex string to facilitate further processing. In the first scheme, the complex string is divided into string segments 420 each comprising a prefix 422 and a simple string 424. A prefix may be a NULL prefix. In the second scheme, the complex string is divided into string segments 430, each comprising a simple string 424 followed by a suffix 426. A suffix may be a NULL suffix. According to the first scheme, string segments 420, individually identified as 420-0, 420-1, 420-2, and 420-3 are followed by a suffix 426. According to the second scheme, prefix 422 is followed by string-segments 430, individually identified as 430-0, 430-1, 430-2, and 430-3. Either of the two schemes may be used, as long as the same scheme is used consistently.

Figure 5:
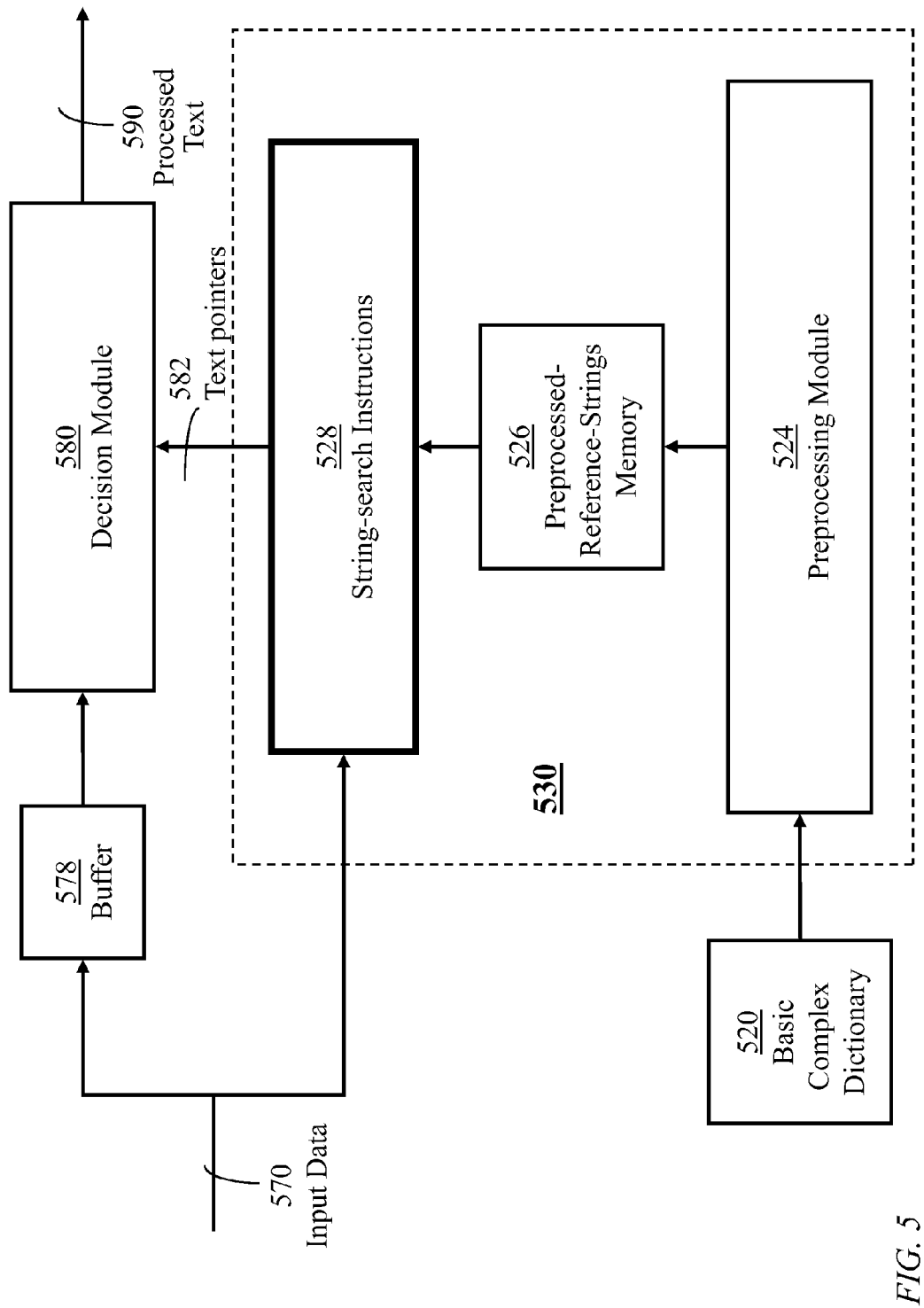
FIG. 5 illustrates a mechanism for detecting and locating complex strings in input data and communicating results to a decision module which determines a course of action, in accordance with an embodiment of the present invention.

FIG. 5 illustrates a mechanism 530, in accordance with an embodiment of the present invention, for detecting and locating any complex string belonging to a basic complex dictionary 520 in received input data 570 of a specific data stream. The mechanism 530 comprises a preprocessing module 524 for dividing each complex string into string segments according to either of the two segmentation schemes of FIG. 4. The segmented complex strings, together with other associated data are stored in a memory 526. The preprocessing module 524 is activated only in response to changes in the basic complex dictionary 520. The changes may include deletion or addition of reference complex strings.

A string-search module 528 receives input data 570 in data units and uses the segmented complex strings together with their associated data stored in memory 526 to determine the occurrence, or otherwise, of any of the complex strings of the basic complex dictionary 520 in the input data. When the occurrence of a complex string is determined, the position of the found complex string in the input data 570 is submitted to a decision module 580 which may take some corrective actions such as deleting the complex string from the input data 570 to produce a processed text 590, or simply identifying the detected complex string in the processed text 590. The string-search module 528 is a time-critical component of the mechanism 530 and, therefore, optimizing the string-search process is of paramount importance. However, even if the execution time is rendered negligibly small, a block of the input data 570 need be retained for possible modification if a specific reference complex string is found in the input data. The retained data block, which may comprise multiple data packets, a single data packet, or a fraction of a packet, is held in a buffer 578. An upper bound of the size of a held data block, and hence a required storage capacity of buffer 578, depends largely on the method of search.

Figure 6:
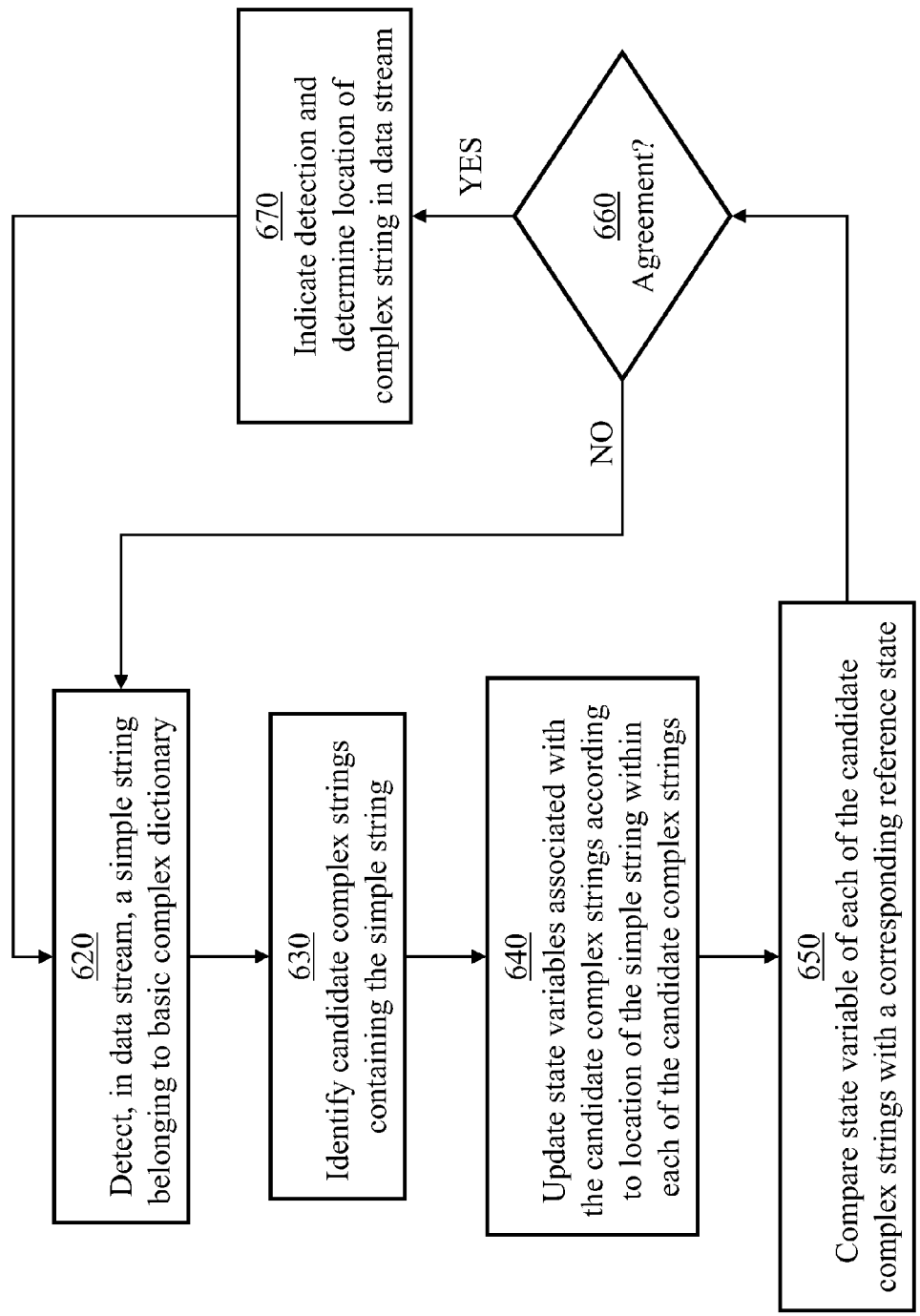
FIG. 6 illustrates the main steps of a method of detecting complex strings in accordance with an embodiment of the present invention.

FIG. 6 illustrates an overview of the method of the present invention. Initially, a state variable and a corresponding reference state are associated with each complex string in the basic complex dictionary 520. In step 620, a simple search detects a simple string in an examined data stream. The detected simple string may be one of a number of simple strings detected at a specific position in the data stream. The detected simple strings may belong to more than one complex string of the basic complex dictionary, and more than one detected simple string may belong to one complex string. Detected simple strings belonging to a specific complex string may be considered individual or collectively in the process of determining whether the specific complex string is present in the data stream.

Considering one detected simple string at a time, step 630 identifies all complex strings in the complex dictionary, which contain the simple string. Step 630 may employ any of well-established simple-search methods, such as the Aho-Corasick method. Up to this point, each of the identified complex strings is treated as a candidate complex string. In step 640, the state variable associated with each candidate complex string is updated according to successive positions, in the data stream, at which any simple string belonging to the candidate complex strings is detected. In step 650, the updated state variable of each candidate complex string is compared with a corresponding reference state to determine the existence, or otherwise, of the candidate complex string in the data stream. Step 660 examines the results of the comparison for each candidate complex strings individually. If detection is ascertained for an individual candidate complex string, step 670 indicates detection of the candidate complex string then determines its location in the data stream and reports all relevant information to the decision module 580. The process then proceeds to step 620. If detection of the individual complex string is not yet determined, step 660 directs the process to step 620. Preferable, the execution of step 620 is performed after all candidate complex strings are examined in step 650.

Figure 7:
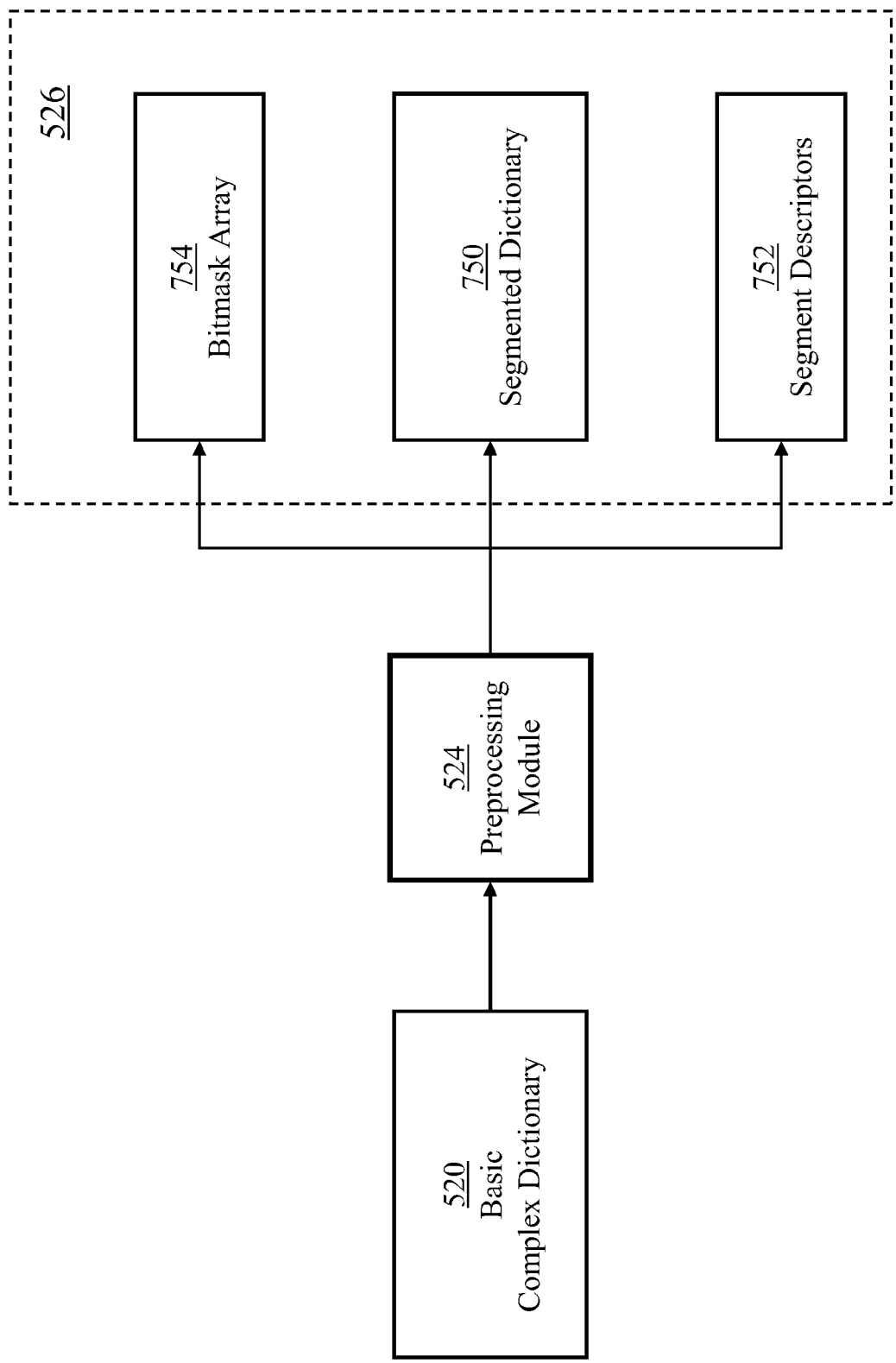
FIG. 7 illustrates a process of segmenting a complex dictionary into a dictionary of string segments with two associated segment descriptors and bitmasks to relate each string segment to its parent complex string, in accordance with an embodiment of the present invention.

FIG. 7 illustrates further details of the segmentation process of the basic complex dictionary 520. The preprocessing module 524 produces a segmented dictionary 750, a set of segment descriptors 752, and a bitmask array 754. The segmented dictionary 750 includes either string-segments 420 for each complex string, followed by a suffix 426 or a prefix 422 followed by string-segments 430 (FIG. 4). The segmented dictionary 750, the set of segment descriptors 752, and the bitmask array 754 may be held in separate memory devices or may share a common memory device.

A segment descriptor associated with each string segment 420 or 430 defines the composition of the string segment. If the first segmentation scheme of FIG. 4 is used, a segment descriptor indicates lengths of the prefix and simple string of a string segment and the length of the suffix 426. If the second segmentation scheme is used, a segment descriptor indicates the length of the prefix 422 and the lengths of a simple string and its suffix.

A bitmask is also associated with each string segment 420 or 430 in order to bind the string segment to its parent complex string.

Figure 8:
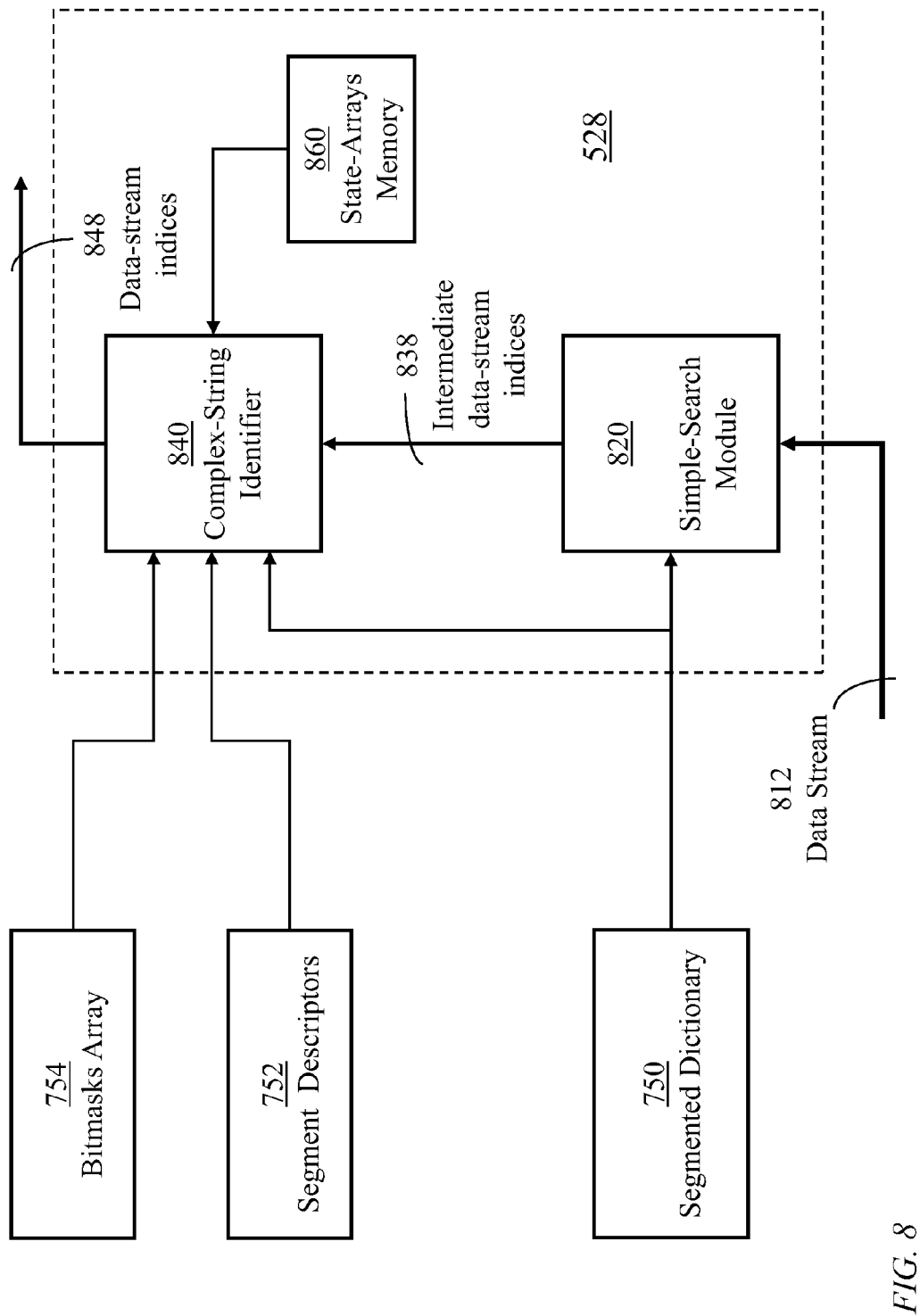
FIG. 8 illustrates a mechanism for detecting reference complex strings in a data stream using the segmented dictionary structure of FIG. 7, the mechanism using a simple-search module, and a complex-string-identification module, in accordance with an embodiment of the present invention.

FIG. 8 details the string-search module 528 which comprises a simple-search module 820 and a complex-string-identifier module 840. The simple-search module 820 receives data units belonging to a data stream 812, detects the occurrence of any of the simple strings in the segmented dictionary 750, and determines the position of each detected simple string in the data stream. Any of prior-art methods of simple search, such as trie-based search methods, may be used in module 820. Module 820 locates any detected simple string in the input data and communicates corresponding indices (pointers) 838 to the complex-string-identifier module 840. Such indices serve only as intermediate indices which may be used in locating corresponding indices 848 for locating a complex string, if any, in the data stream 812. The complex-string-identifier module 840 relates each simple-string index it receives from the simple-search module to: (1) a corresponding string-segment in the segmented dictionary 750; (2) a corresponding segment descriptor in the set 752 of segment descriptors; and (3) a corresponding bitmask in bitmask array 754. Complex-string-identifier module 840 maintains a STATE array each element of which being a Boolean STATE variable for a corresponding complex string in the basic complex dictionary 520. Each Boolean STATE variable contains a predefined number of bits; 64 for example. The complex-string identifier comprises software instructions for implementing a search method described below with reference to FIGS. 9-11.

In a preferred embodiment of the present invention, an Aho-Corasick automaton is created and used in the simple-search module 820. The Aho-Corasick method detects simple strings in the order of their occurrence in the input data stream. The method also detects all overlapping simple strings that end at a single position in the data stream. Such overlapping simple strings would have at least one common end character. For example the two simple-strings chief and editor-in-chief would be reported if the simple-string editor-in-chief is encountered in the data stream 812 and if the two simple strings are placed in separate entries in a corresponding simple dictionary. The main desirable properties of a real-time string-search method include efficient memory utilization, predictable computation effort, and orderly listing where strings are detected in the order in which they occur in an examined data stream. Notably, the Aho-Corasick method, which is applicable to detection of simple strings, possesses such properties and is therefore a preferred method for incorporation in the simple-search module 820.

Figure 9:
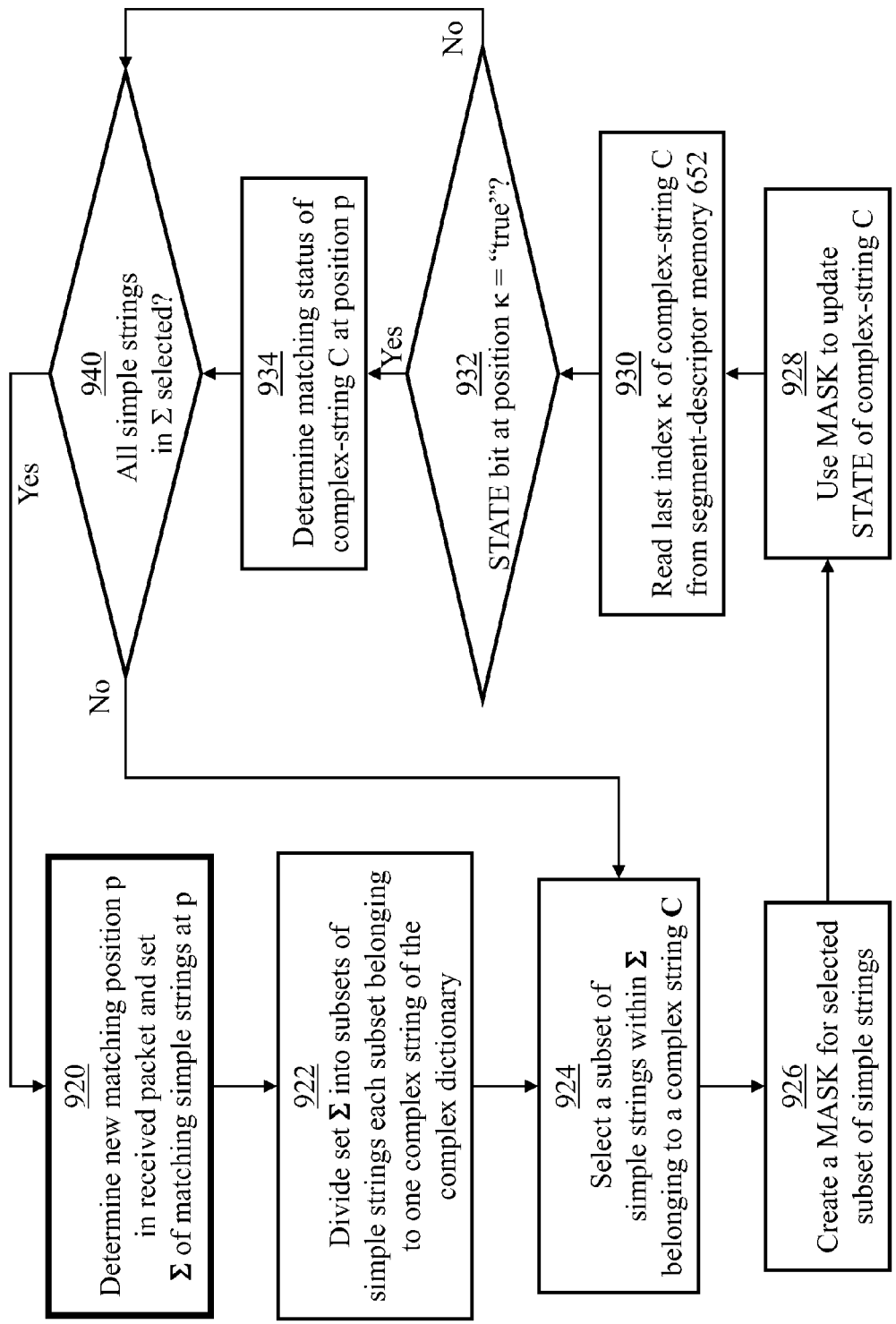
FIG. 9 illustrates an exemplary method implemented in the complex-string-identification module of the mechanism of FIG. 8 in accordance with an embodiment of the present invention.

FIG. 9 illustrates the main steps of the search method implemented in the complex-string identifier 840. In step 920, a matching position, p, of at least one simple string belonging to the segmented dictionary 750 is received. There may be a set Σ containing several simple strings ending at position p and all belonging to the segmented dictionary 750. The simple strings in set Σ may belong to more than one complex string of the basic complex dictionary 520. The set Σ is then divided in step 922 into subsets of simple strings with each subset including simple strings belonging to only one complex string in the basic complex dictionary 520. In step 924, one of the subsets, associated with a specific complex string C is selected. In step 926, an intermediate Boolean variable MASK is created using bitmasks in bitmask array 754 corresponding to the subset of simple strings selected in step 924. The value of the Boolean variable MASK is initialized as an opaque mask where each bit is set to "false", which may be represented by logical '0', at the start of each step 924. The MASK is then modified under the condition of congruence of prefixes (or suffixes if the second scheme of FIG. 4 is used) of the simple strings of the subset and corresponding prefixes (or suffixes) in the specific complex-string C.

In step 928, the intermediate Boolean variable MASK is used to update the Boolean variable STATE in a STATE-array memory 860.

In step 930, the index, κ, of the last simple string in the specific complex string C, is selected from segment-descriptor set 752, and the bit in Boolean variable STATE in position κ is examined. If the value of the bit is "false" (logical "0"), it is determined that the portion of the input data terminating in position p does not contain the specific complex string C and step 940 is then executed. If the value of the bit is "true" (logical "1"), it is then determined that the portion of the input data terminating in position p contains all the string segments 420 of the complex string C, and the occurrence of the entire complex string C in the input data is then decided in step 934 according to the ω indefinite characters of the suffix of complex string C. If ω=0, indicating a NULL suffix, an occurrence of complex string C is ascertained and step 934 reports, to the decision module 580, an occurrence of the specific complex string C in the portion of the input data terminating in position p. If ω>0 and the suffix is incongruent with corresponding characters spanning positions (p+1) to (p+ω), it is determined in step 934 that the input data received so far does not contained the specific complex string C. Otherwise, step 934 reports, to the decision module 580, an occurrence of the specific complex string C in the portion of the input data terminating in position (p+ω) and step 940 is executed next.

Step 940 determines if all strings in set Σ have been processed. If the set Σ is not yet exhausted, another subset is processed (step 924). Otherwise, a new simple-string matching position p, as determined in step 920, is considered.

Figure 10:
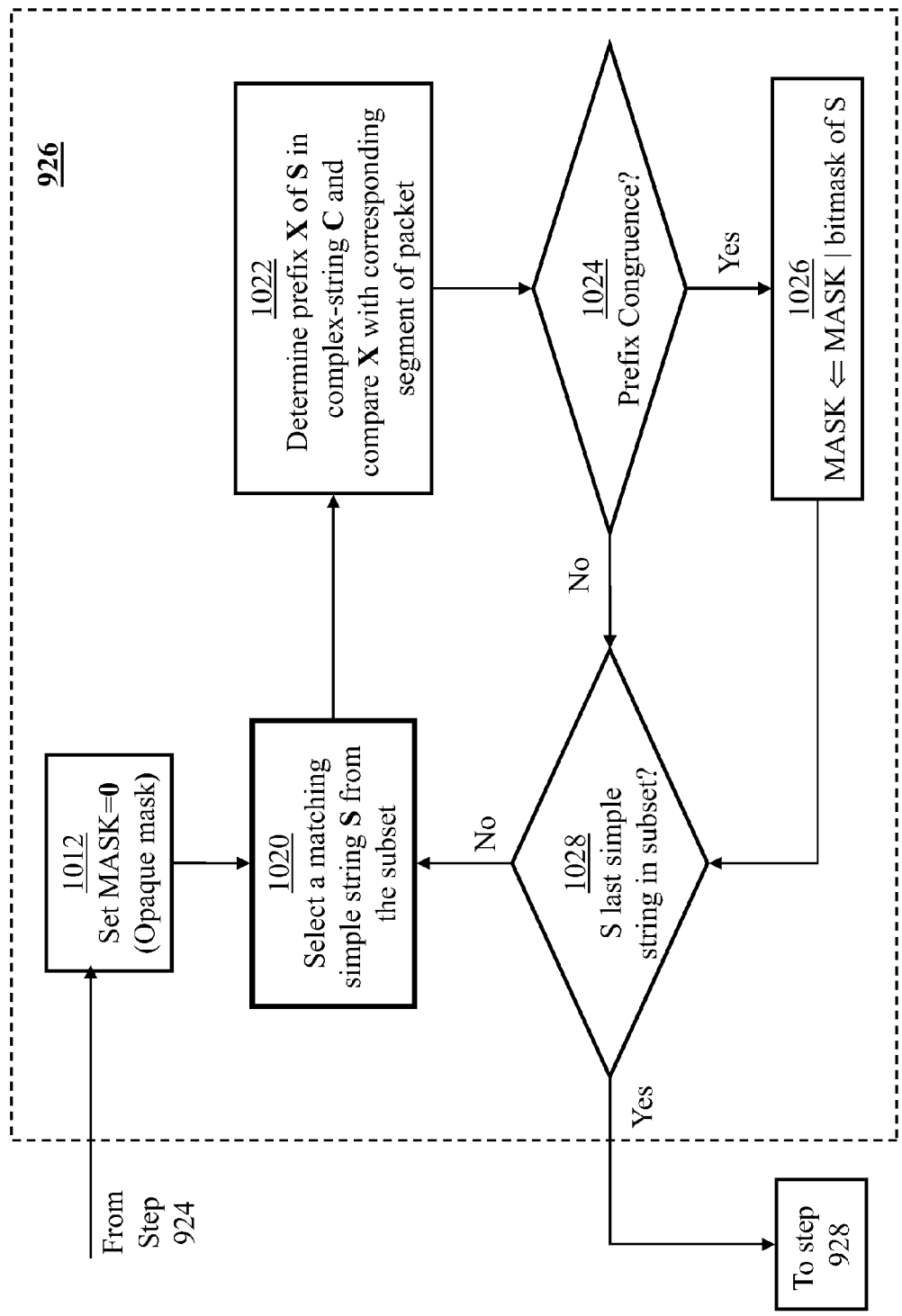
FIG. 10 illustrates details of a step of constructing a composite Boolean MASK in the method of FIG. 9 in accordance with an embodiment of the present invention.

FIG. 10 details step 926 of FIG. 9. In step 1012, a multi-bit Boolean variable MASK is initialized as an opaque mask, i.e., each bit of the Boolean variable MASK is initialized to logical "0". The MASK is associated with a subset σ of simple-strings in Σ belonging to a single complex string. In step 1020, a simple string, denoted S, is selected from the subset σ. The prefix, denoted X, of S in the specific complex string C is determined in step 1022 and compared with the prefix Y of S in a corresponding data segment in the segmented dictionary 750. In step 1024, if the prefix X and prefix Y are determined to be congruent, step 1026 updates the MASK by performing a bit-wise OR of the MASK and the bitmask associated with simple string S in bitmasks memory 754, and step 1028 is executed next. The bitwise OR function implemented in step 1026 is denoted by the symbol "|". Thus the operation: MASK|bitmask-of-S comprises logical OR operations for corresponding bits in the Boolean variable "MASK" and the Boolean constant "bitmask-of-S". If the prefix X and prefix Y are incongruent, step 1024 leads directly to step 1028. In step 1028, if S is determined to be the last string in the subset σ, step 926 is considered complete and the new value of MASK is ready for use in step 928 of FIG. 9.

Figure 11:
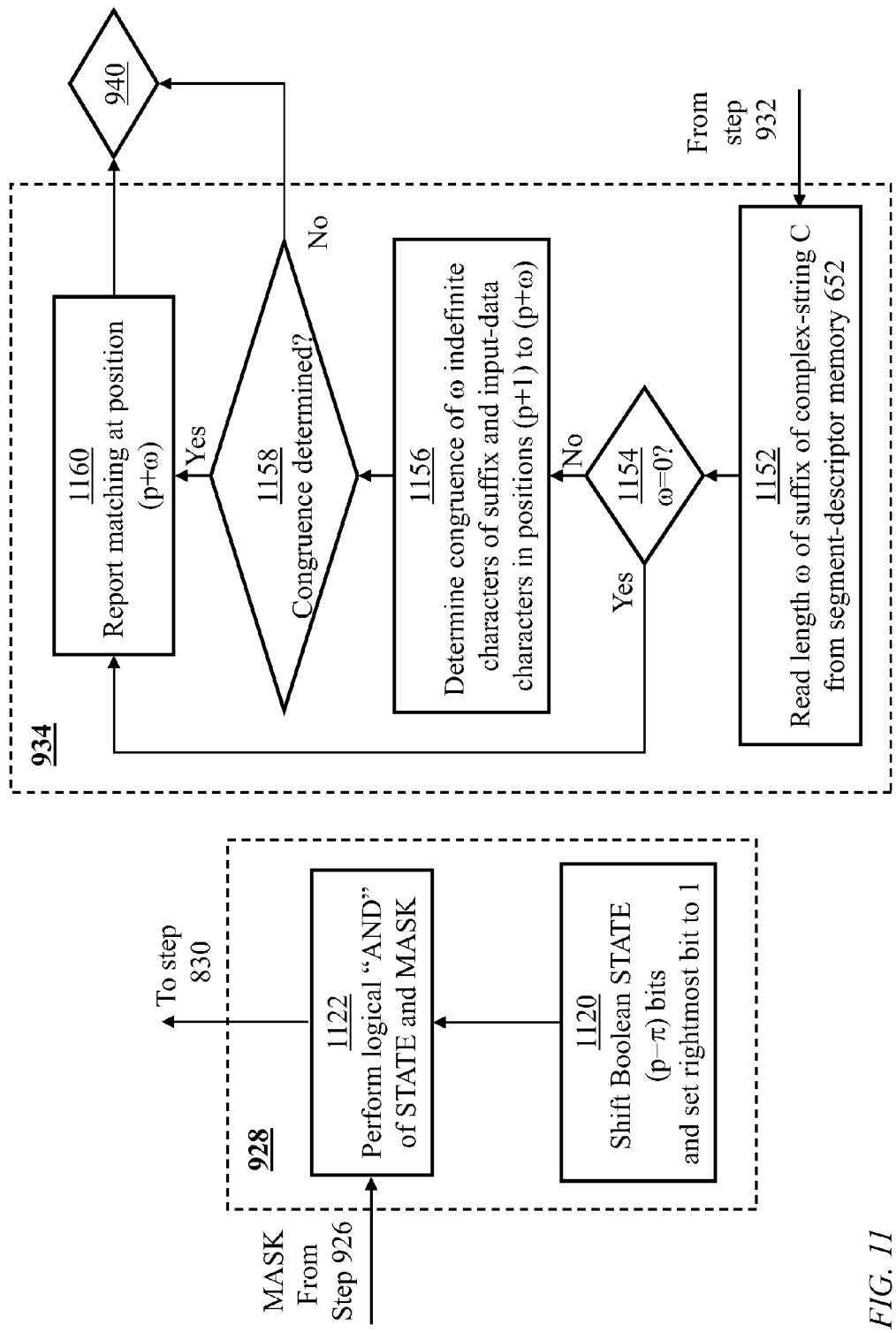
FIG. 11 illustrates details of a step of updating a Boolean STATE variable for determining search progress of a specific complex string in accordance with an embodiment of the present invention.

FIG. 11 details steps 928 and 934 of FIG. 9. Step 928 updates the Boolean variable STATE associated with complex string C according to the set Σ of simple strings determined to terminate in position p of the input data. The previous position in the input data at which simple strings belonging to complex string C were detected is denoted π. Thus, after execution of step 928, the present value of p overwrites the value of π for use in a subsequent execution of step 928 related to the same complex string C. Either of two schemes for identifying current positions p and previous positions π may be adopted. In a first scheme, both p and π may take cyclical values based on the length (number of bits) assigned to a bitmask (and hence to a state variable). In a second scheme, the values of p and π may be represented according to the word length of the computing platform. For example, with a word length of four bytes, p or π may assume a value between 0 and 4,294,967,295. With the search process continuing indefinitely, the values of p and π are still cyclic requiring a modulo process. However, the modulo process is used at a much lower rate.

The span between a current position p and a previous position π associated with a specific complex string is determined as $[p-\pi]_{modulo \ \Gamma}$, Γ being determined according to either of the two schemes described above. In step 1120, the Boolean variable STATE is shifted to the left a number of positions equal to the span associated with the complex string C. Each position in STATE, from which a bit is shifted, is assigned a value of "0", except the right-most position which is always assigned a value of "1" after a shift operation. In step 1122, a bit-wise logical ANDing is performed and the result overwrites the variable STATE.

Figure 24:
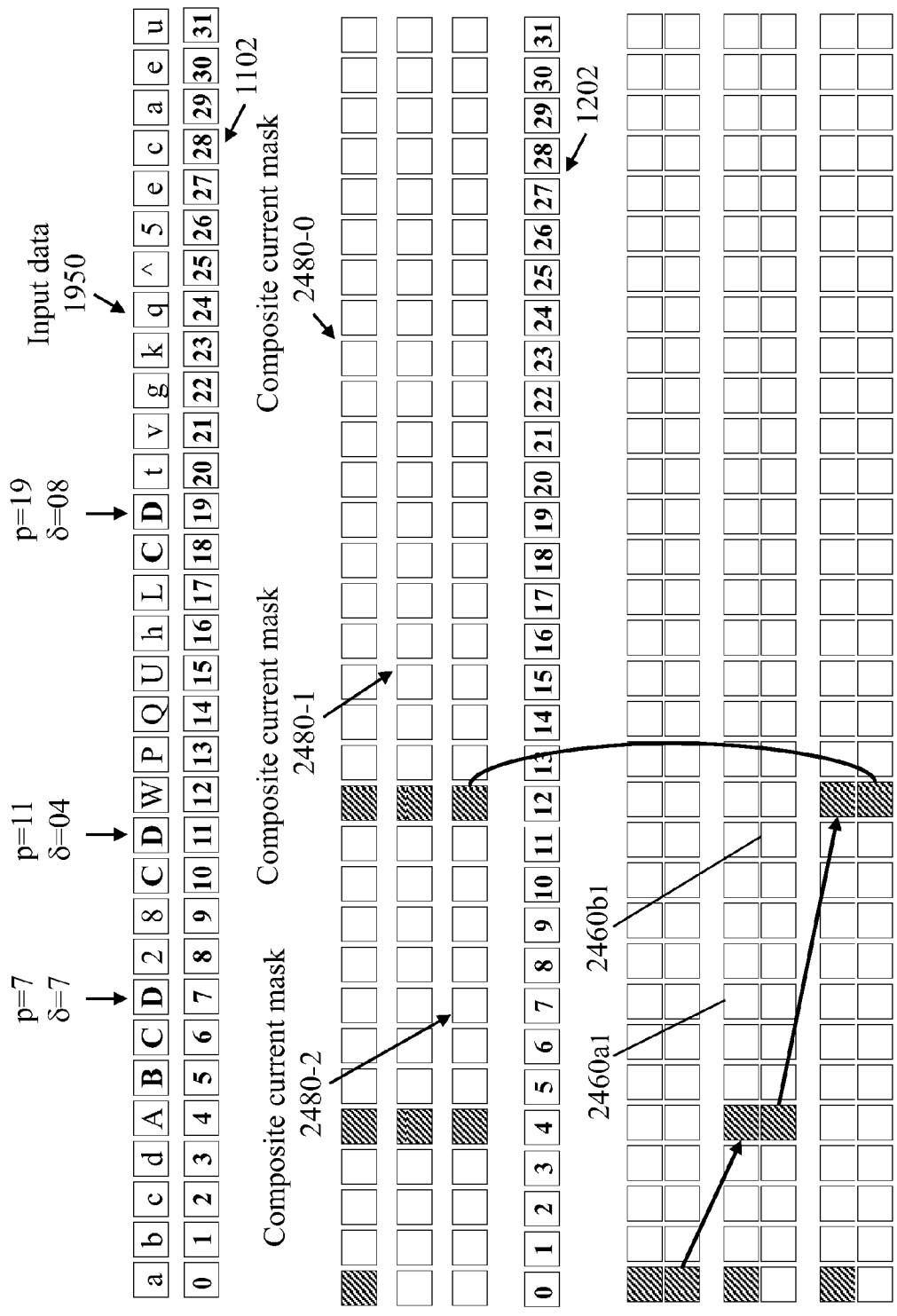
FIG. 24 illustrates the steps of FIG. 19 using an equivalent alternate form of Boolean bitmasks in accordance with an embodiment of the present invention.

As described, the bitmask used in step 1122 is considered to originate at the rightmost bit and, consequently, the Boolean state variable is shifted a number of bits equal to $(p-\pi)_{modulo \ \Gamma}$, where Γ equals $2^W$, W being the word length assigned to the position indices p and π, in the direction from right to left with the rightmost bit of the Boolean variable set to equal TRUE (binary 1). Alternatively, the bitmask may originate at the leftmost bit and, consequently, the Boolean state variable may be shifted in the direction from left to right with the leftmost bit of the Boolean variable set to equal TRUE as illustrated in FIG. 24.

Figure 15:
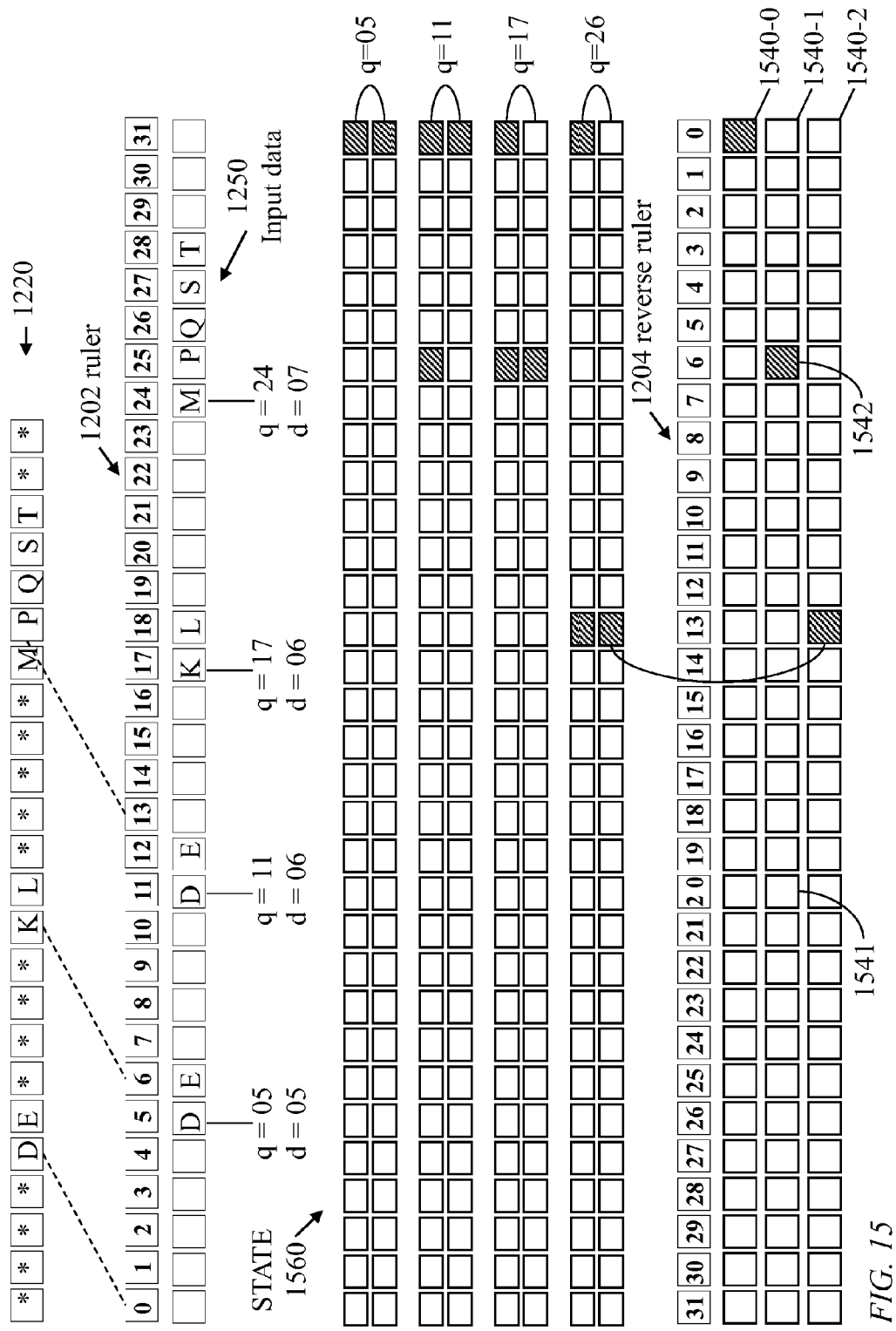
FIG. 15 illustrates steps of detecting a target complex string in the same input data considered in FIG. 12 but with the complex string segmented according to the second segmentation form of FIG. 4.

In an alternate realization of the mechanism illustrated in FIGS. 7-9, the complex string may be segmented according to the second segmentation form of FIG. 4 and the segmented dictionary may comprise a prefix and a number of string segments for each complex string in the complex dictionary, with each string segment comprising a simple string and suffix. Step 1022 would then be replaced with a step of determining a suffix of simple string S. Step 934 which determines congruence of a suffix of a complex string and a respective portion of input data would be replaced with a step of determining congruence of a prefix of the complex string and a respective portion of input data. FIG. 15 illustrates steps of detecting a target complex string based on using the second segmentation form of FIG. 4.

FIG. 11 also details step 934. Having determined, in step 932, that the bit in position κ of the Boolean STATE variable equals a binary 1, it remains to ascertain the congruence of the suffix, if any, and a corresponding portion of the input data. In step 1152, a length ω of the suffix of complex string C is read from the set of segment descriptors 752. If ω is found to be zero, step 1154 directs the search process to step 1160 to report matching of the complex string C at position p. If ω>0, step 1156 determines whether the ω indefinite characters of the suffix are congruent to input data characters spanning positions (p+1) to (p+ω). If congruence is ascertained, step 1158 directs the search process to step 1160 to report success in detecting complex string C in a portion of the input data ending at position (p+ω). If the congruence conditions are not met, step 1158 directs the search process to step 940 to either complete the examination of a current set Σ or consider a new matching position p.

Exemplary Execution of the Method

Figure 12:
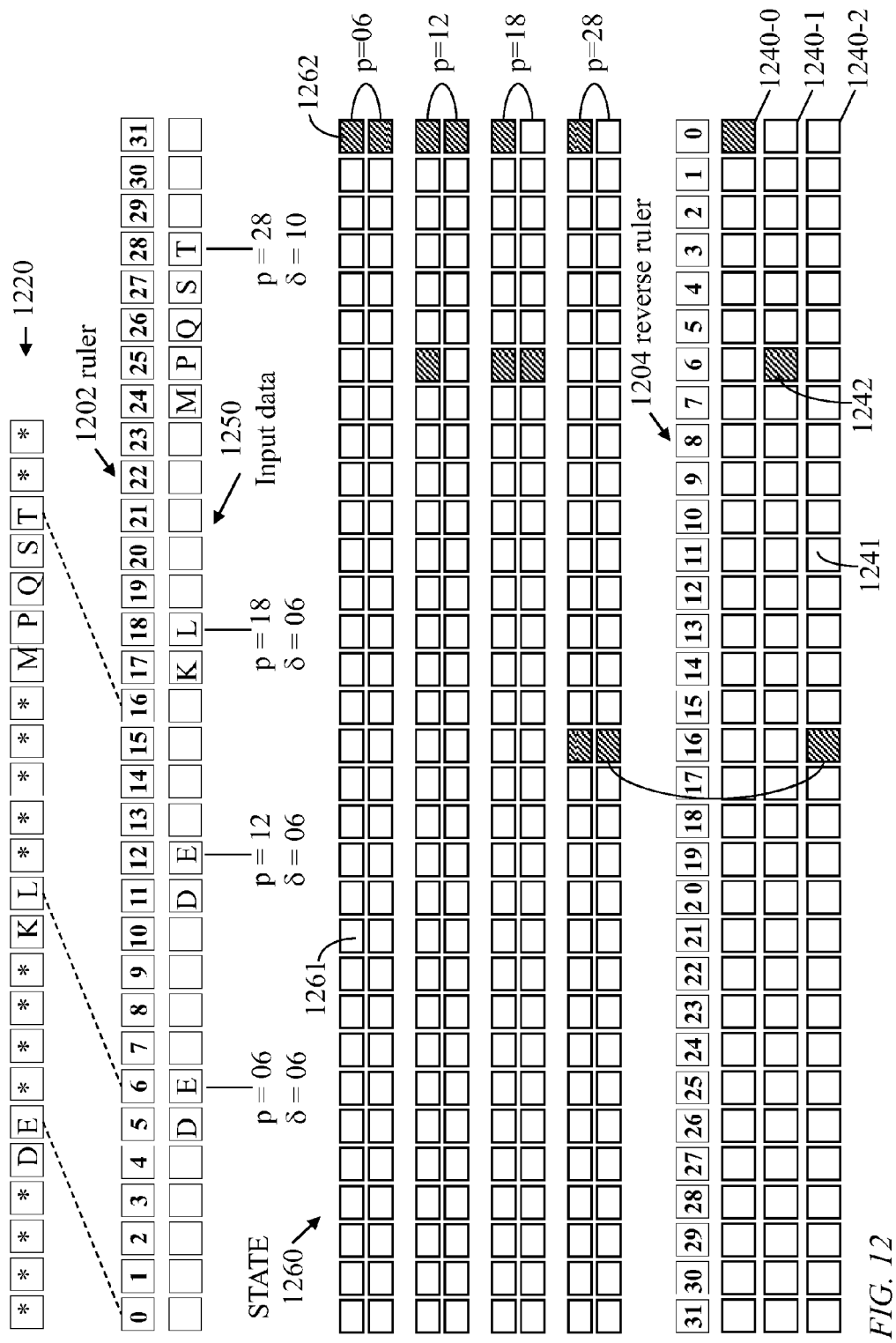
FIG. 12 illustrates steps, according to the method of FIG. 9, of detecting a target complex string in input data where the complex string is segmented according to the first segmentation form of FIG. 4 and each of two consecutive string segments in the input data is compatible with the first string segment of the target complex string.

FIG. 12 illustrates steps of detecting an exemplary target complex string 1220 in input data 1250 of a data stream. The complex string 1220 is segmented according to the first segmentation form of FIG. 4. The complex string 1220 comprises three simple strings "DE", "KL", and "MPQST" having prefixes of length 4, 4, and 5, respectively. With the last simple string having a suffix of length 2, the total length of the complex string 1220 is 24 characters. The prefixes and the suffix comprise indefinite characters, each indefinite character being marked as "*". The input data comprises two consecutive strings "DE" which are compatible with the first simple string the target complex string 1220.

A ruler 1202 is used to indicate a position of each character of the input data 1250 and each character of the complex string 1220. The input data extracted from a data stream may continue ad infinitum and, therefore, a position in the input data is indexed as a cyclic number. The ruler 1202 is a cyclic ruler having a range dictated by a number of factors including the hardware platform on which the method is realized into an article of manufacture.

Figure 19:
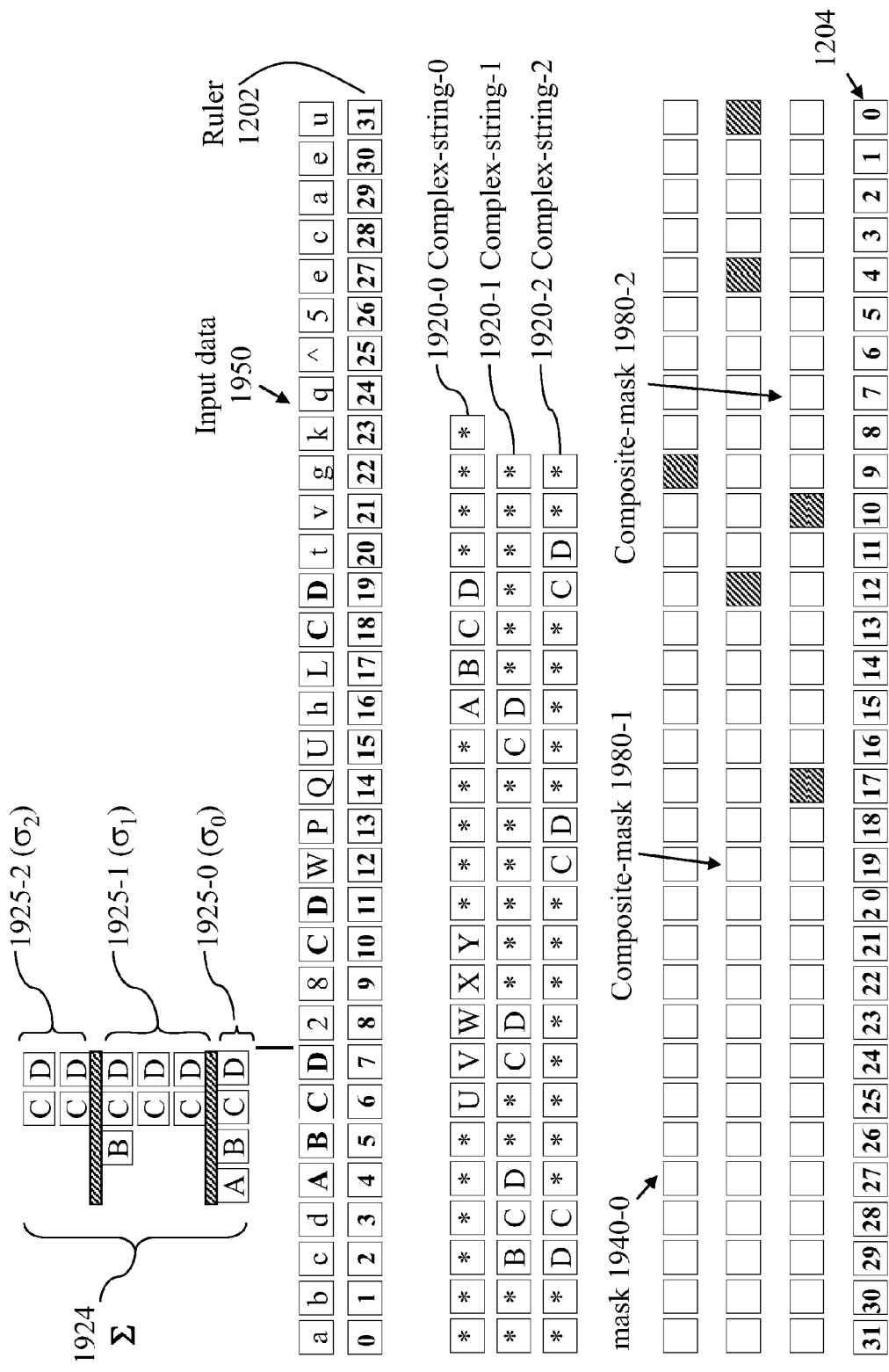
FIGS. 19-21 illustrate steps of detecting any of three target complex strings of a complex dictionary in a first input-data sample in accordance with an embodiment of the present invention.

In general, the simple search module 820 may detect several simple strings ending in one position of the input data. FIG. 12, however, illustrates a case where the simple-search module 820 detects only one simple string at each of current detection positions 06, 12, 18, and 28. A case with multiple simple-string detection is illustrated in FIG. 19. The gap δ between successive detection positions p is indicated in FIG. 12. Notably, the preceding detection position to current detection point p=06 is either 0 when the search mechanism is initialized, or known from a previous detection of a simple string belonging to the same exemplary complex string 1220.

As described earlier, the preprocessing module 524 produces an array of bitmasks 754, each bitmask indicating the relative positions of each simple string within its parent complex string. Three bitmasks 1240, individually identified as 1240-0, 1240-1, and 1240-2, respectively indicate the relative positions of simple strings "DE", "KL", and "MPQST" in complex string 1220. A Boolean state variable 1260 having 32 bits is associated with complex string 1220. A current MASK is created in step 926 which is further detailed in FIG. 9. A bit in a bitmask 1240 set to logical FALSE (binary 0) is represented by a blank cell 1241, and a bit set to logical True (binary 1) is represented by a hatched cell 1242. Likewise a bit in state-variable 1260 set to logical FALSE is represented by a blank cell 1261 and a bit set to logical TRUE (binary 1) is represented by a hatched cell 1262. A similar representation is used in FIGS. 13-24.

The current MASK is an outcome of bitwise OR operations of bitmasks of all simple strings detected at a given position in the input data 1250 subject to congruence of a prefix of each of simple strings to a corresponding portion of the input data as indicated in step 1022. Notably, the state variable 1260 is initialized in step 1012 as an opaque mask in the process of creating a current mask detailed in FIG. 10. In the example of FIG. 12, it is assumed that the congruence condition is always satisfied and, because there is only one simple string detected at each of the four positions indicated, the current mask at each of the four detected positions (p=06, 12, 18, and 28) is equal to the bitmask in bitmask array 754 of the corresponding detected simple string.

As indicated in step 1120, the state variable 1260 is shifted (p−π) bits (modulo Λ) and the rightmost bit of the shifted state variable is set to equal logical TRUE, which is equated to binary 1. With π=0 at position p=06, and starting with an opaque state { }, the state variable is shifted 6 bits to the left with the bit in position 0 set to equal binary 1 to attain a state of {0}. The shifted state variable is bitwise ANDed with bitmask 1240-0 corresponding to simple string "DE". The result is a state of {0}, i.e., the rightmost bit of the state variable is set to binary 1 and each other bit is set to binary 0. There are two states corresponding to each detected simple string in the input data 1250; a first state resulting from executing step 1120 and a second state resulting from executing step 1122 of FIG. 11. At position p=12, the state variable is shifted (12−6) bits with the rightmost bit set to true to yield a state of {0, 6}. The state variable 1260 is ANDed with bitmask 1240-0 corresponding to simple string "DE" and the result is a state {0}. At position p=18, the state variable is shifted (18-12) bits and the rightmost bit is set to binary 1 leading to state {0, 6} again. The state variable 1260 is ANDed with bitmask 1240-1 corresponding to simple string "KL" to yield a state of {6}. At p=28, the state variable 1260 is shifted (28−18) bits with the rightmost bit set to binary 1 leading to state {0, 16}. The state variable 1260 is then ANDed with bitmask 1240-2 corresponding to simple string "MPQST" to yield a state of {16}, which is the reference state of complex string 1220. It remains to determine if the suffix of the complex string 1220 is congruent to the two characters succeeding the last simple string "MPQST". Step 1152 of FIG. 11 determines that the suffix of complex string 1220 is of length 2 characters and step 1156 ascertains congruence of the suffix (occupying positions 22 and 23 of complex string 1220) is congruent with the portion of the input data 1250 occupying positions 29 and 30, and step 1160 reports the presence of complex string 1220 in the input data 1250 starting at position 9 and ending in position 30. The bitmasks 1240 and the state variable 1260 are indexed in an ascending order from right to left, with the rightmost bit of each assigned an index of zero. A reverse ruler 1204 is therefore provided in FIG. 12 and in subsequent figures.

Figure 13:
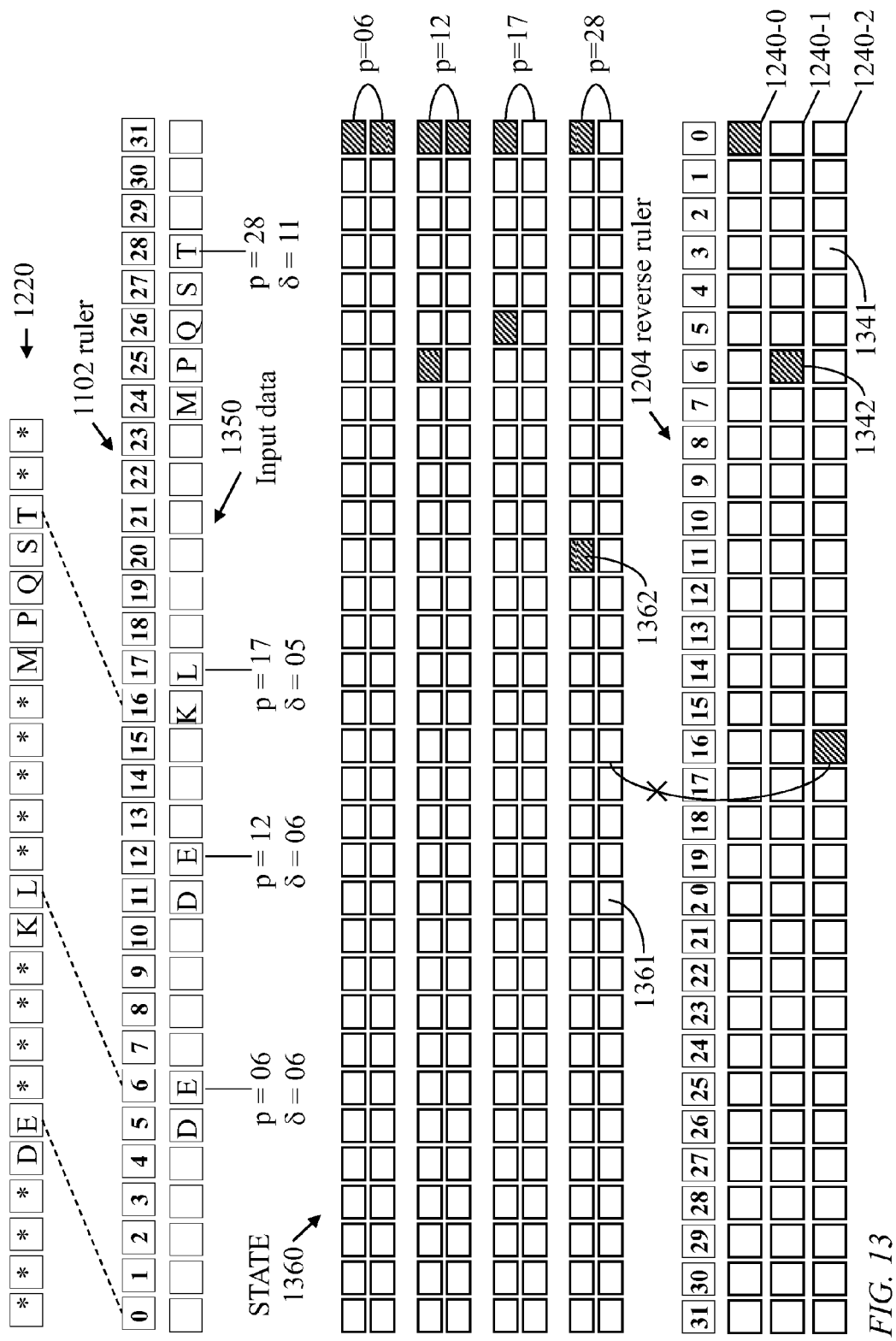
FIG. 13 illustrates steps of searching for a target complex string in input data which contains a complex string of close proximity to the target complex string, where the complex string is segmented according to the first segmentation form of FIG. 4.

FIG. 13 illustrates a search for the same target complex string 1220 of FIG. 12 in input data 1350, which differ slightly from input data 1250, following the steps described above. The bitmasks 1240 in FIGS. 12 and 13 are identical. Like state variable 1260, state variable 1360 attains the states {0}, (0), {0, 6}, 0}, {0, 6} after processing the second simple string "DE". However, because the simple string "KL" appears one-character earlier in input data 1350 in comparison with input data 1250, the last state {0, 6} is followed by state {6} (instead of corresponding {0, 6} of FIG. 12), leading to a subsequent opaque state { } after processing the simple string "KL" (compared to corresponding state {6} in FIG. 12). The subsequent states attained when position p=28 is encountered are {0, 11} which yields the opaque state { } when ANDed with bitmask 1240-2. At this point, step 932 of FIG. 9 directs the process to step 940 to start the search for a simple string, in the input data, that belongs to the complex string 1220.

Figure 14:
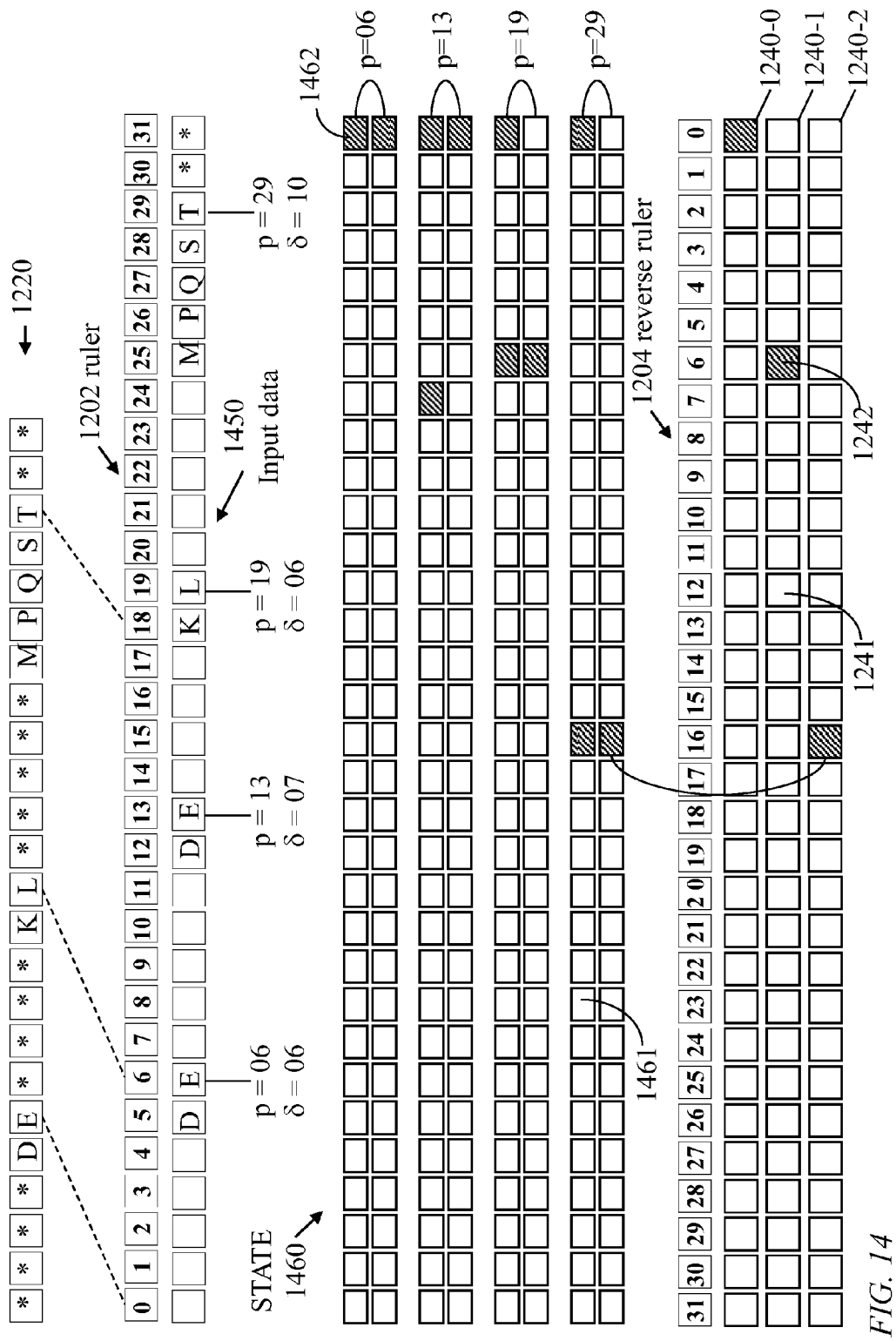
FIG. 14 illustrates steps of detecting a target complex string in input data where the complex string is segmented according to the first segmentation form of FIG. 4 and two consecutive string segments in the input data have prefixes of different sizes but each of the corresponding simple strings is compatible with the first simple string of the target complex string.

FIG. 14 illustrates a search for the same target complex string 1220 of FIG. 12 in input data 1450 which differs slightly from input data 1250. The simple strings "DE", "DE", "KL", and "MPQST" in input data 1450 occupy positions p=6, 13, 19, and 29 compared to 6, 12, 18, and 28 in input data 1250. The first detected simple string "DE" is irrelevant in the examples of FIGS. 12 and 14. The effect of the one-character shift is that the state variable 1460 acquires states {0}, {0}, {0,7}, {0}, etc., instead of states {0}, {0}, {0, 6}, {0}, etc. of state variable 1260, and the complex string 1220 is determined to occupy positions 10 to 31 of the current cycle of input data 1450.

FIG. 15 illustrates the detection of complex string 1220 in input data 1250 using similar steps to those of FIG. 12 except that the complex string 1220 is segmented according to the second segmentation form of FIG. 4. The bitmasks 1540-0, 1540-1, and 1540-2 for simple strings "DE", "KL", and "MPQST", respectively, of the complex string 1220 are simple bitmasks each having a single bit set to binary 1 as illustrated by hatched cells 1542 in FIG. 15. A blank cell 1541 represents binary 0. Simple strings "DE", "DE", "KL", and "MPQST" are detected at positions q=5, 11, 17, and 24. Starting with an opaque state { }, the state variable 1560 assumes states {0}, {0}, at position q=5, {0, 6}, {0}, at position q=11, {0, 6}, {6}, at position q=17, and {0, 13}, {13}, at q=24. The last state {13} is in agreement with the bitmask 1540-2 of the last simple string "MPQST" of complex string 1220. If congruence of the prefix of the first string "DE" in complex string 1220 with corresponding characters occupying positions 7, 8, 9, and 10 in input data 1250 is ascertained, the portion of input data 1250 occupying positions 7 to 30 is considered to include the entire complex string 1220.

Figure 16:
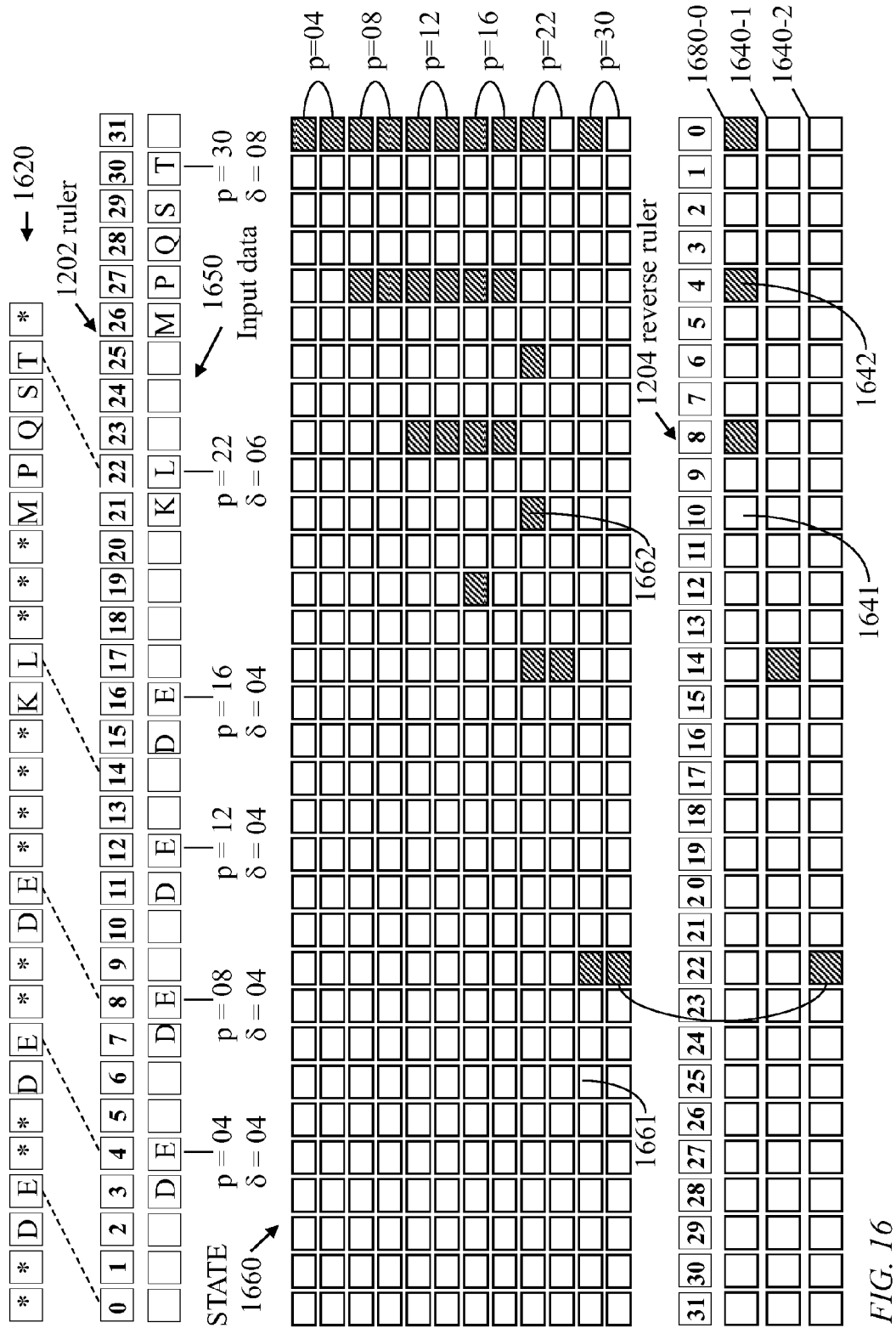
FIG. 16 illustrates steps of detecting a target complex string in input data where the complex string is segmented according to the first segmentation form of FIG. 4 and where the target complex string includes multiple equivalent string segments leading to a composite (comb) MASK, in accordance with an embodiment of the present invention.

FIG. 16 illustrates steps of detecting a target complex string 1620 in input data 1650 where the complex string 1620 includes multiple congruent string segments each including a prefix of two characters and the simple string "DE". As described earlier, the purpose of a bitmask associate with a simple string is to relate the simple string to its parent complex string. When a simple string "DE" is detected in input data 1650, means for considering all occurrences of "DE" in the complex string 1620 need be provided. In accordance with the method of the present invention, a composite (comb) bitmask 1680-0 is devised in step 926 of FIG. 9 (further detailed in FIG. 10). Subject to congruence conditions of step 1022, the composite bitmask 1680-0 includes a bit set to binary 1 (logical TRUE) at positions 0, 4, and 8 where binary 1 at position 0 corresponds to the position of the end character of the first occurrence of "DE", and the binary 1 in positions 4 and 8 correspond to the end characters of the second and third occurrences of "DE" in the complex string. Bitmasks 1640-1 and 1640-2, for simple strings "KL" and "MPQST" respectively, are simple bit masks; each includes only one bit set to binary 1. The process of determining the presence, or otherwise, of complex string 1620 in input data 1650 proceeds as described in FIGS. 9 to 11, and as further illustrated in the example of FIG. 12. It is noted that the input data includes an additional simple string "DE" which is detected by the simple-search module 820 and automatically filtered out. For each position p where at least one simple string is detected in the input data 1650, the state variable 1660 is updated in step 1120 then in step 1122 illustrated in FIG. 11. Starting with the opaque state { }, the state variable 1660 successively attains the states {0}, {0}, {0, 4}, {0, 4}, {0, 4, 8}, {0, 4, 8}, {0, 4, 8, 12}, {0, 4, 8}, {0, 6, 10, 14}, {14}, {0, 22}, and {22} corresponding to positions p=4, 8, 12, 16, 22, and 30, respectively. It is noted that there are two states corresponding to each detected simple string in the input data 1650; a first state resulting from step 1120 and a second state resulting from step 1122. Successful detection is ascertained when the last state of state variable 1660 attains the value of {22} which is the reference state for the complex string 1620.

Figure 17:
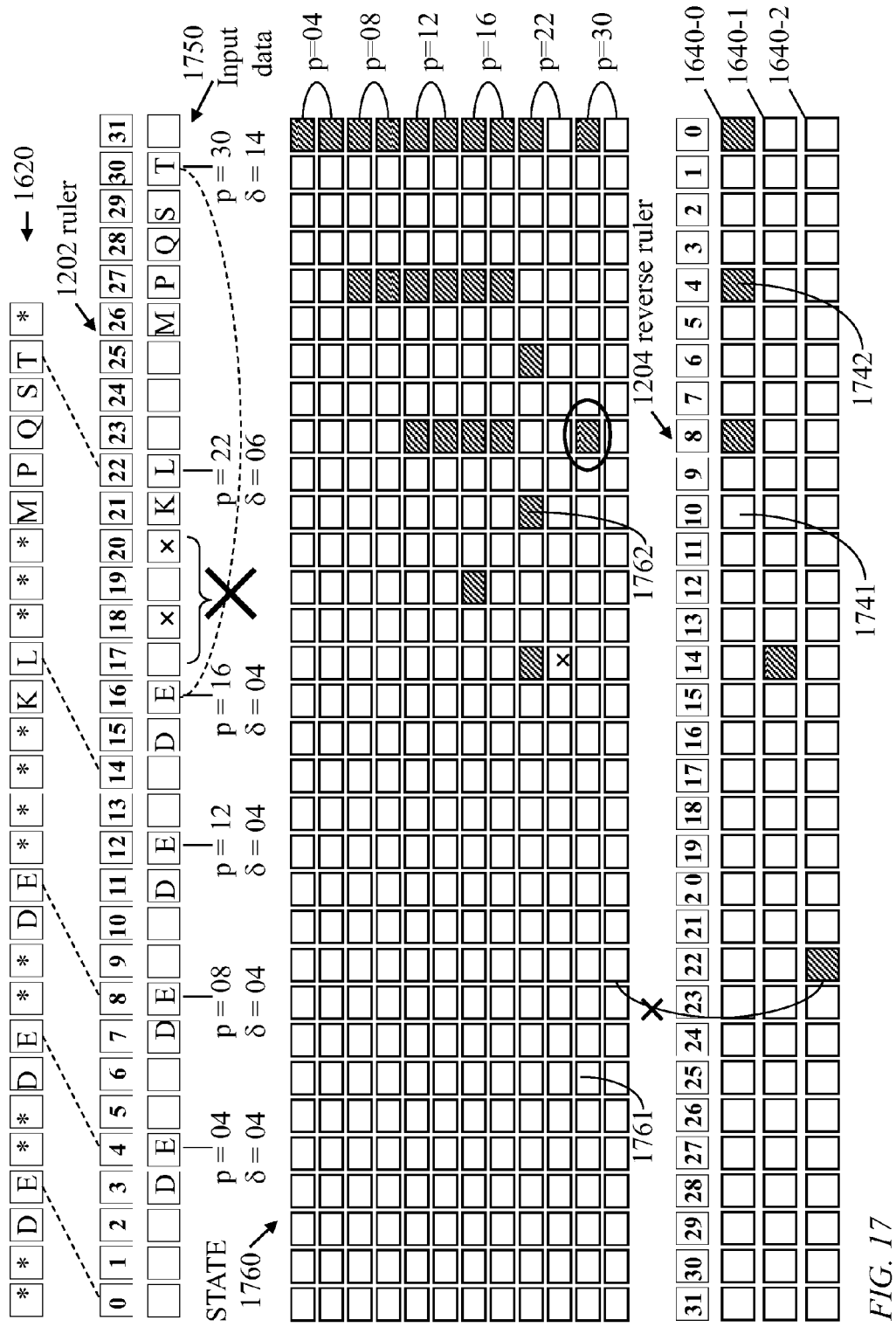
FIG. 17 illustrates steps of detecting the target complex string considered in FIG. 16 in input data which includes characters that are incongruent with corresponding prefix characters within the target complex string.

FIG. 17 illustrates the case of FIG. 16 but with characters preceding simple string "KL" in input data 1750 associated with classes that are different from classes of their counterpart characters in the prefix of simple string "KL" in the target complex string 1620. This results in step 926 (FIGS. 9 and 10) yielding an opaque mask for p=22 which when ANDed with the current value of the Boolean state variable 1760 yields an opaque state variable, which in effect erases the state information acquired so far. The subsequent state of the state variable 1760 at position p=30 is then {0, 8} which does not include the target state {22}. The deviation of the state 1760 from its counterpart state 1660 is indicated in FIG. 17 by the mark "x" in state variable 1760 corresponding to p=22.

Figure 18:
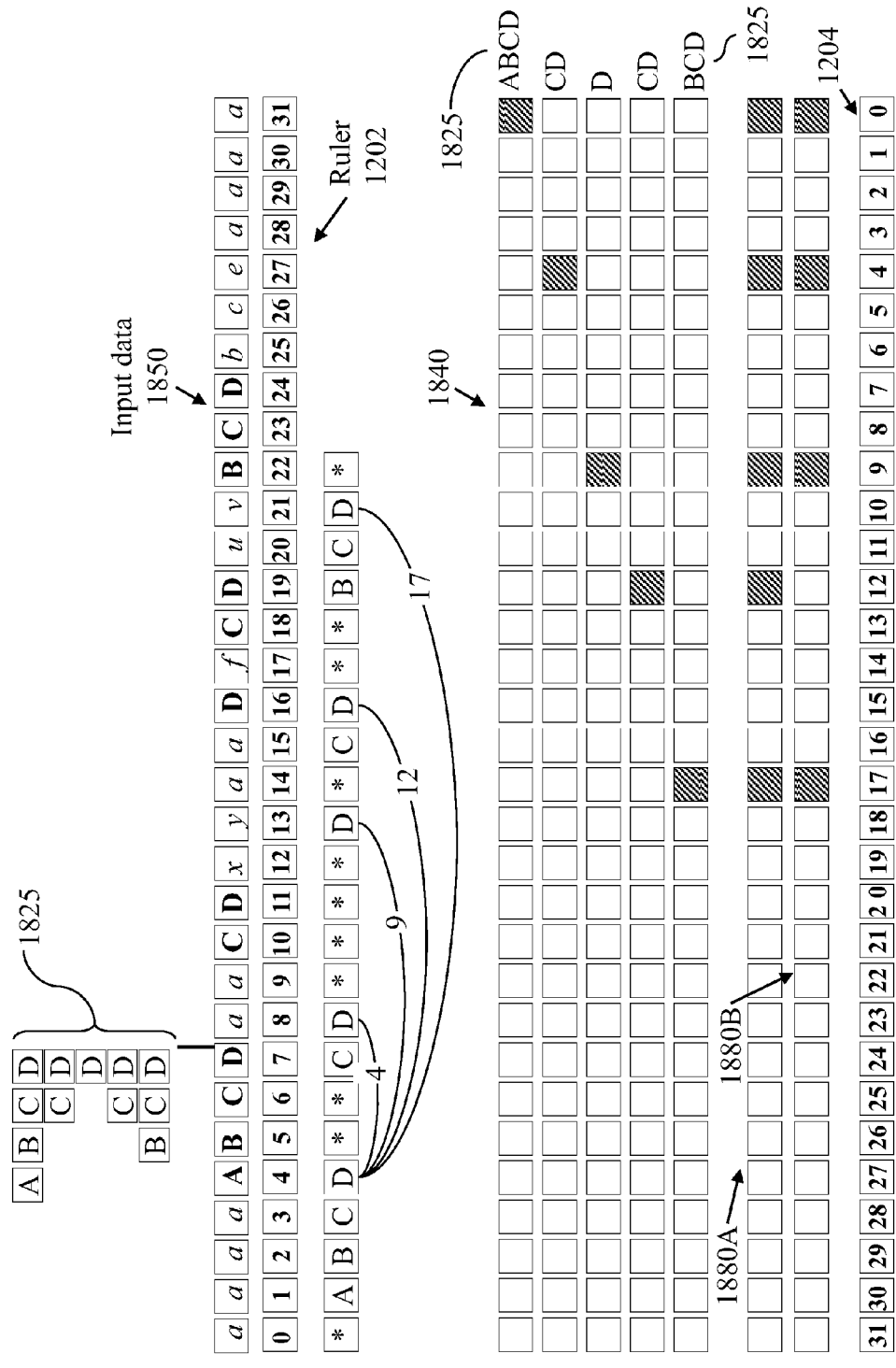
FIG. 18 illustrates a process of creating a composite mask in accordance with an embodiment of the present invention.

FIG. 18 illustrates the execution of step 926 of the method of FIG. 9, which is further detailed in FIG. 10. The target complex string 1820 includes simple strings "ABCD", "CD", "D", "CD", and "BCD". At position 7 of input data 1850, the simple search module 820 detects the five simple strings 1825 in proper order as indicated. The bitmasks (1840) for the five simple strings 1825 yield a composite mask 1880A if all the congruence conditions of step 1022 are met. A composite mask 1880B results if the indefinite character 'f' preceding the simple string "CD" ending in position 19 of the input data is incongruent with the prefix character of position 14 of the target complex string 1820.

FIG. 19 illustrates a set of reference complex strings 1920-0, 1920-1, and 1920-2 and input data 1950 of a data stream comprising simple strings belonging to the set of reference complex strings 1920. The first reference complex string 1920-0 contains simple strings "UVWXY", and "ABCD". The second reference complex string 1920-1 contains simple strings "ABCD", "CD", and "CD". The third reference complex string 1920-2 contains simple strings "DC", "CD", and "CD". Each indefinite character in the reference complex strings is identified by a symbol "*". Individually, the indefinite characters may belong to different classes despite the common identification "*". The segmented dictionary 750 includes eight simple strings "UVWXY", "ABCD", "BCD", "CD", "CD", "DC", "CD", and "CD". The simple-search module 820 examines the input data to detect simple strings belonging to the segmented dictionary 750.

At position 7 (according to ruler 1202) of the input data 1950, the simple-search module 820 detects a set $\Sigma^{(0)}$ of six simple strings "ABCD", "BCD", "CD", "CD", "CD", "CD", out of the eight simple strings of the segmented dictionary 750, and associates each of the detected simple strings with a parent complex string. A subset $\sigma_0$ of $\Sigma^{(0)}$, referenced as 1925-0, contains detected simple strings (only one in this example) belonging to complex string 1920-0. A subset $\sigma_1$ of $\Sigma^{(0)}$, referenced as 1925-1, contains detected simple strings (three in this example) belonging to complex-string 1920-1. A subset $\sigma_2$ of $\Sigma^{(0)}$, referenced as 1925-2, contains detected simple strings (two in this example) belonging to complex-string 1920-2. The simple string "CD" further appears separately in two portions of input data 1950 to be detected later by the simple-search module 820. Each of the simple strings in set $\Sigma^{(0)}$ belongs to at least one string segment in at least one complex string in the set of reference complex strings 1920. String segments in the set of reference complex strings 1920 are candidate string segments. Their presence in the input data 1950 may be ascertained only after satisfying congruence conditions as described earlier with reference to FIG. 10 (step 1022). The set of reference complex strings 1920 represents a basic complex dictionary 520 containing only three complex strings. In general, a basic complex dictionary 520 may comprise a significantly larger number of complex strings, and detected simple strings such as those of subset $\sigma_1$ of $\Sigma^{(0)}$ may belong to many candidate string segments in segmented dictionary 750 (FIG. 7) which, in turn, may belong to many candidate complex strings in the basic complex dictionary. Each candidate string segment is considered for further processing only after ascertaining congruence of its indefinite characters and corresponding characters of the input data.

Assuming congruence of all the indefinite characters in the reference complex strings 1920 to corresponding characters of input data 1950, based on the prefix and suffix definitions, the current masks corresponding to subsets $\sigma_0$, $\sigma_1$, $\sigma_2$ of $\Sigma^{(0)}$ are determined according to the bitwise OR operation of step 1026. Thus, the bitmask for subset $\sigma_0$ of $\Sigma^{(0)}$ has only one bit in position 9 set to binary 1. The position of the set bit corresponds to the displacement (19-10) of the end character "D" of the detected simple string "ABCD" from the end character "Y" of the first simple string "UVWXY" of complex-string 1920-0. The bitmask for subset $\sigma_1$ of $\Sigma^{(0)}$ has three bits in positions 0, 4, and 12 set to binary 1, the positions being determined by the displacement of each of the simple strings in $\sigma_1$ from the end character "D" of the first simple string "BCD" in complex string 1920-1. The bitmask for subset $\sigma_2$ of $\Sigma^{(0)}$ has two bits in positions 10 and 17 set to binary 1, the positions being determined by the displacement of each of the simple strings in $\sigma_2$ from the end character "C" of the first simple string "DC" in complex string 1920-2.

Figure 20:
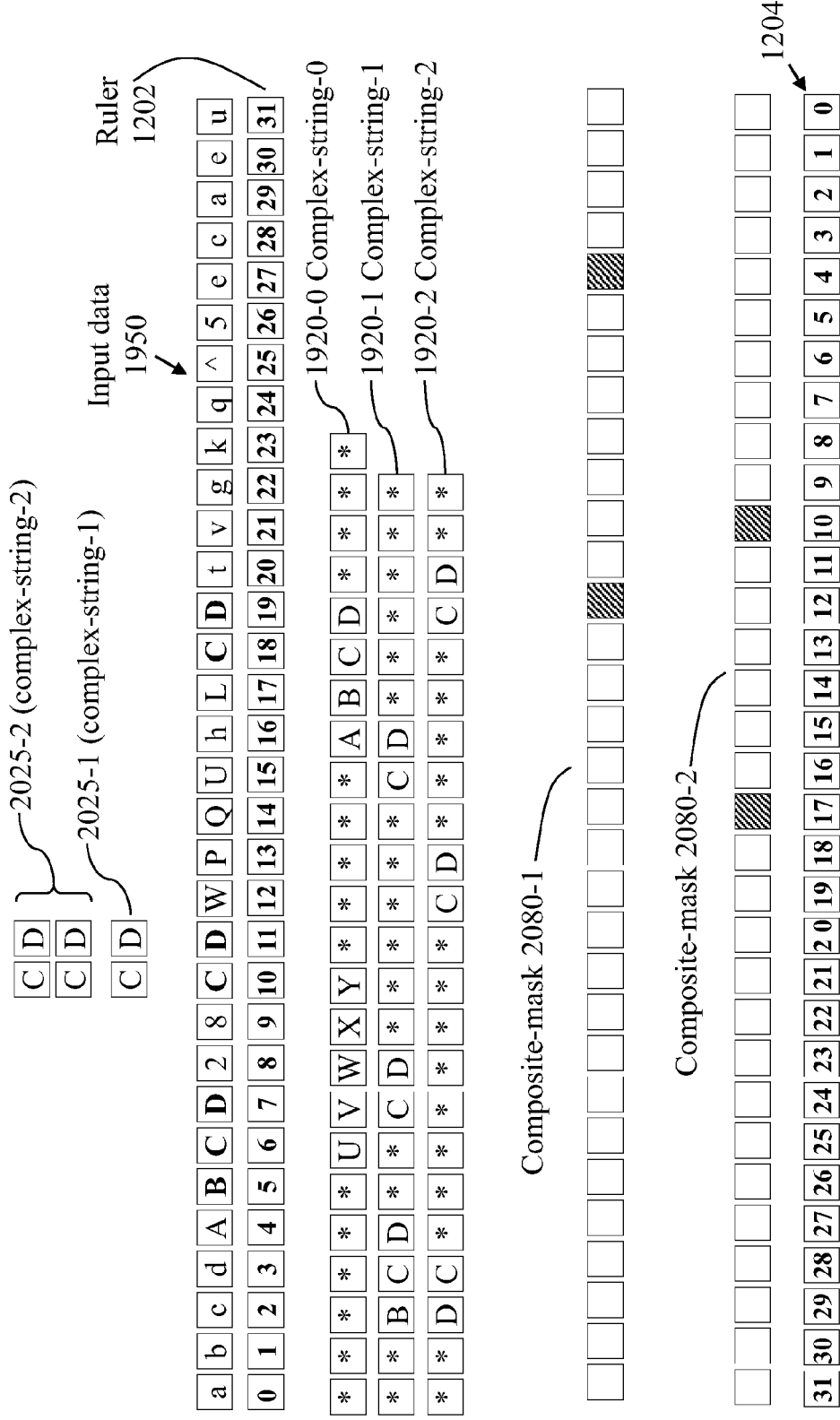

As illustrated in FIG. 20, the simple-search module 820 detects a set $\Sigma^{(1)}$ of three simple strings "CD", "CD", and "CD" at position 11 (according to ruler 1202) of the input data 1950 with a subset 2025-1 having one simple string belonging to complex-string 1920-1, and a subset 2025-2 having two simple strings belonging to complex string 1920-2. With congruent conditions for all suffix and prefixes of each complex string 1920 satisfied, the composite current mask 2080-1 for subset 2025-1 has bits set to binary 1 in positions 4 and 12, determined as the displacements (8-4) and (16-4). The composite current mask 2080-2 for subset 2025-2 is the same as composite current mask 1980-2.

At position 19 (according to ruler 1202) of the input data 1950, the simple-search module 820 detects a set $\Sigma^{(2)}$ identical to $\Sigma^{(1)}$ and the same composite current masks 2080-1 and 2080-2 also apply.

Figure 21:
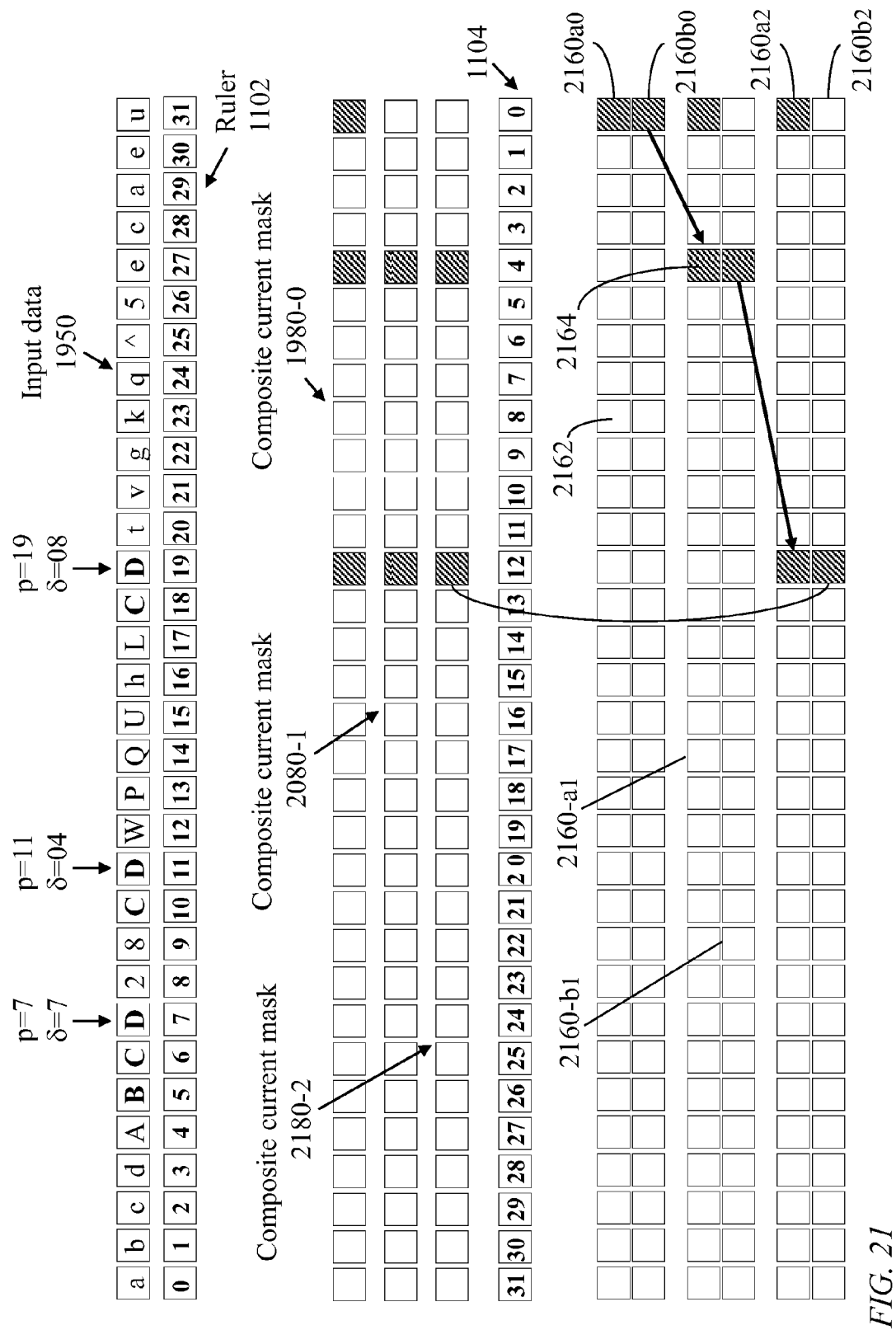

FIG. 21 illustrates the outcome of step 928 which updates the states of state variable 2160 associated with complex string 1920-1 ("BCDCD****CD**"). Complex-string 1920-1 is the only one of complex strings 1920 that is present in the input data 1950. Starting from the null state { }, and following the state transitions effected by step 928 (FIG. 9 and FIG. 11), the successive states of state variable 2160 are {0}, {0}, {0, 4}, {4}, {0, 12}, and {12}, which are identified in FIG. 21 with references 2160a0, 2160b0, . . . , 2160a2, 2160b2. States 2160aj and 2160bj, where j=0, 1, or 2, result from execution of steps 1120 and 1122, respectively, of FIG. 11. The last state {12} equals the reference state of complex-string 1980-1** which is determined as the displacement of the last character of the last simple string "CD" from the last character of the first simple string "BCD".

Figure 22:
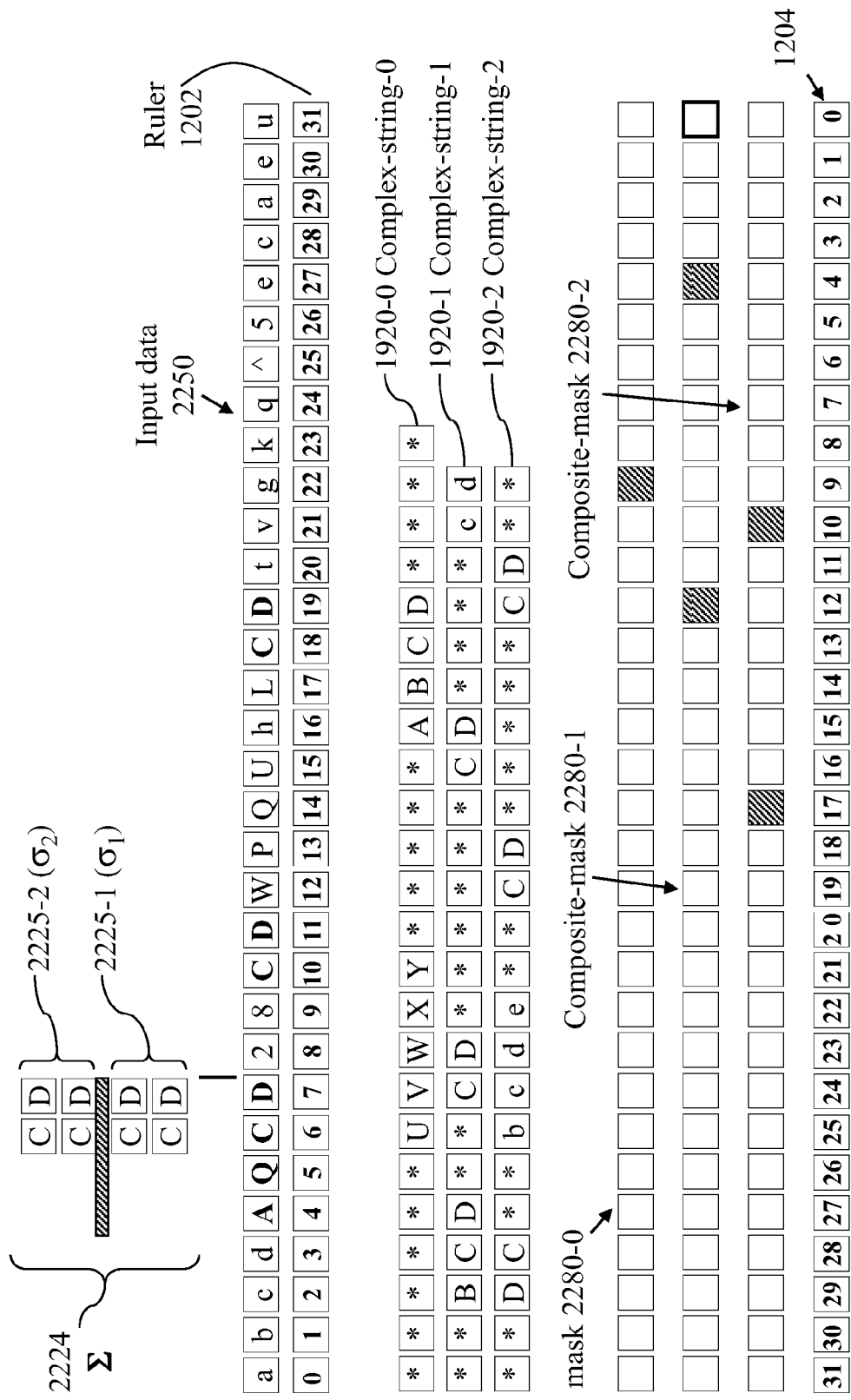
FIGS. 22-23 illustrate steps of detecting any of three target complex strings of a complex dictionary in a second input-data sample in accordance with an embodiment of the present invention.
Figure 23:
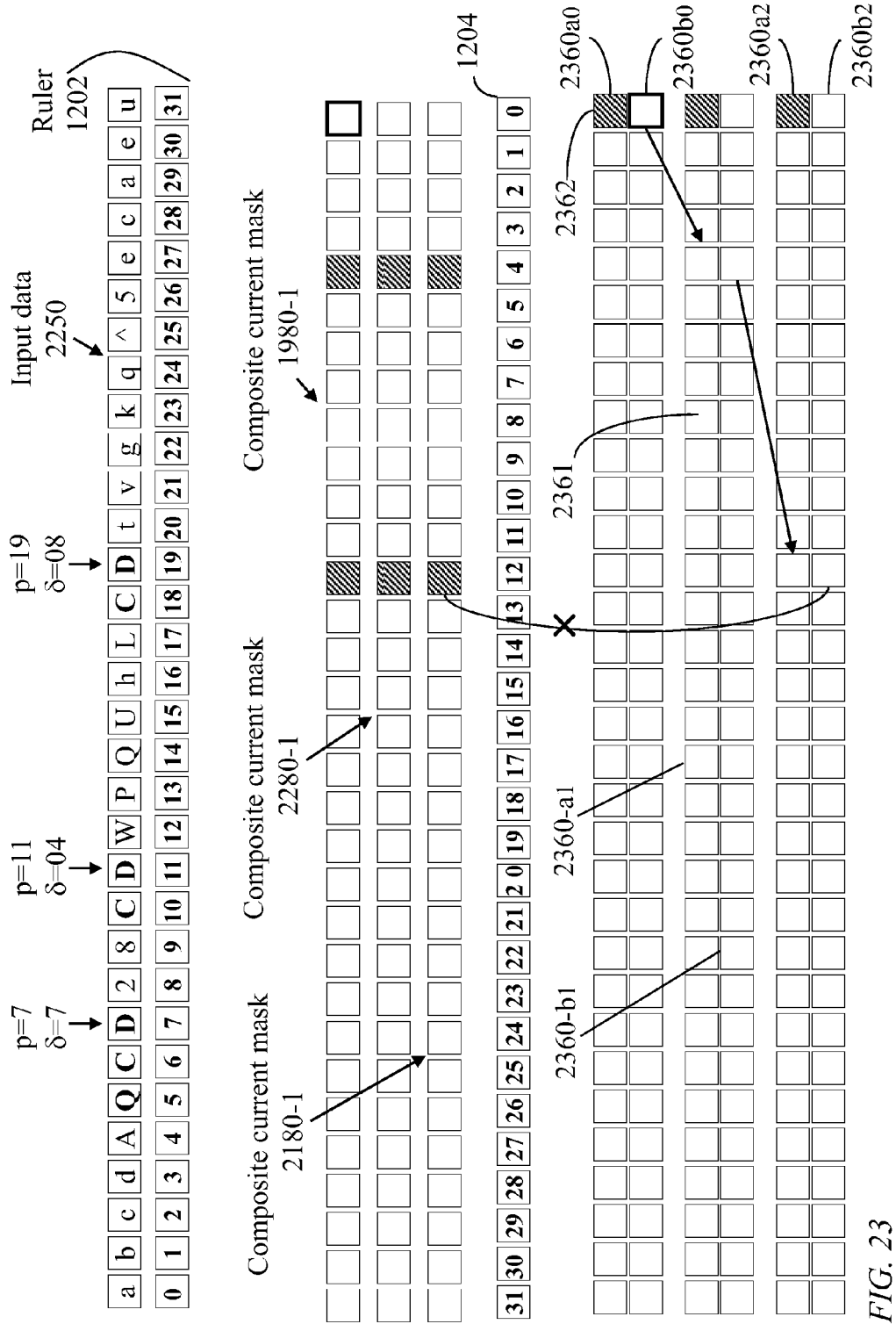

FIGS. 22-23 illustrate a case where the reference complex strings are the same as those of FIG. 19, but the input data 2250 differs only in position 5 (according to the same ruler 1202) where character "B" is replaced with "Q". This results in the absence of simple strings "ABCD" and "BCD" from the set $\Sigma^{(0)}$ and, consequently, a transition from state { }, of state variable 2360 associated with reference complex string 1920-1, to states {0}, then the opaque state { } to indicate absence from the input data 2250 of the first simple string "BCD" of complex string 1920-1, with a final opaque state { }. Thus, starting from the null state { }, and following the state transitions effected by step 928 (FIG. 9 and FIG. 11), the successive states of state variable 2360 are {0}, { }, {0}, { }, {0}, and { }, which are identified in FIG. 23 with references 2360a0, 2360b0, . . . , 2360a2, 2360b2. States 2360aj and 2360bj, where j=0, 1, or 2, result from execution of steps 1120 and 1122, respectively, of FIG. 11.

FIG. 24 illustrates the detection process of FIG. 22 with the bitmasks and Boolean state variables each having the leftmost bit, instead of the rightmost bit, as the origin with index 0. The set of composite current masks 2480-0, 2480-1, and 2480-2 of FIG. 24 is a mirror image of the set of composite current masks 2180-0, 2180-1, and 2180-2 of FIG. 21. The Boolean state variable 2460 of FIG. 24 is a mirror image of the Boolean state variable 2160 of FIG. 21.

Figure 25:
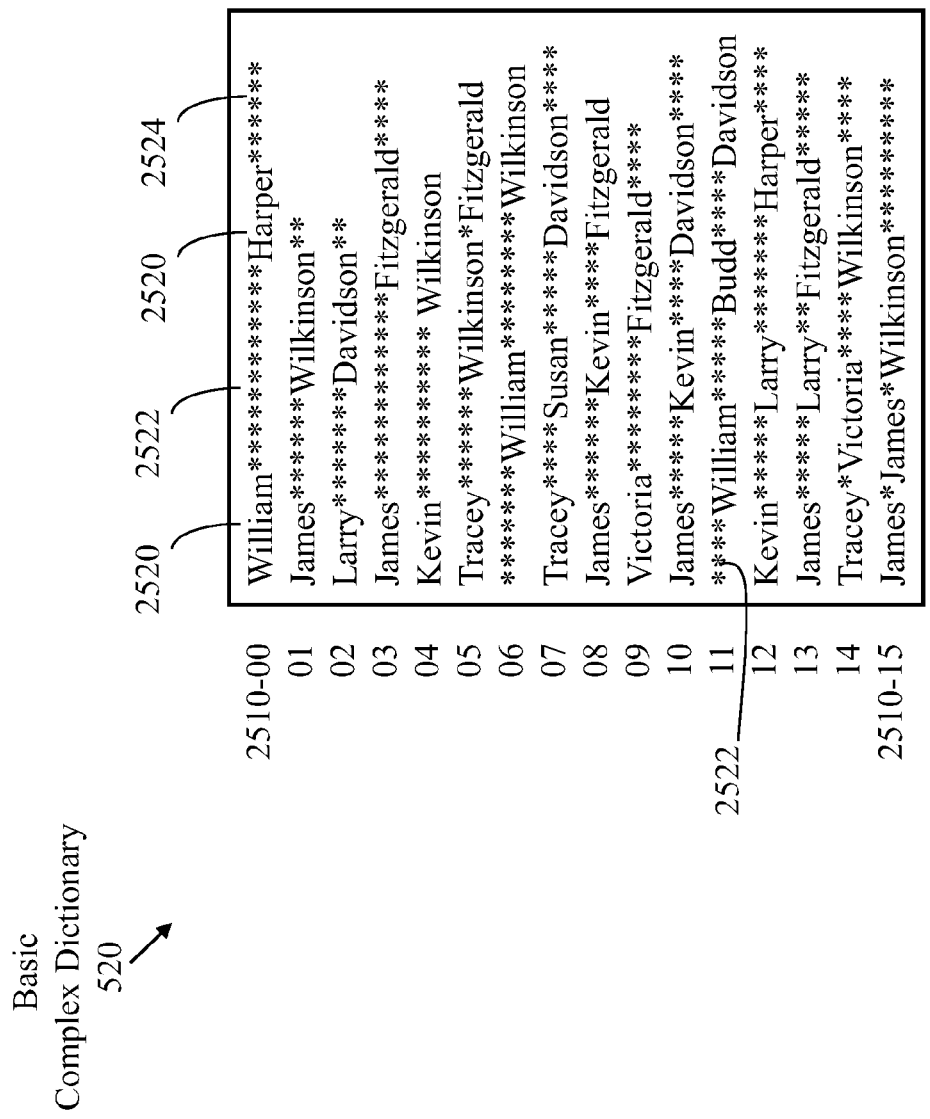
FIG. 25 illustrates an exemplary complex dictionary comprising complex strings where a pair of complex strings may contain identical simple strings for use with an embodiment of the present invention.

FIG. 25 illustrates an exemplary basic complex dictionary 520 (FIG. 5) comprising 16 complex strings 2510-0, 2510-1, . . . , 2510-15, each having simple strings 2520. Successive simple strings 2520 are separated by ambiguous words. Each of complex strings 2510-6 and 2510-11 has a prefix 2522 and each of the remaining complex strings 2510 has a null prefix. Each of complex strings 2510-4, 2510-5, 2510-6, 2510-8, and 2510-11 has a null suffix and each of the remaining complex strings 2510 has a suffix 2524.

The 16 complex strings 2510 are distinct. However, the method described with reference to FIGS. 9-11 tolerates repeated complex strings 2510 in the complex dictionary 520. Several constituent simple strings 2520 are common in more than one complex string 2510. For example, the simple-string "Wilkinson" is common in complex strings 2520-1, 2520-4, 2520-5, 2520-6, 2520-14, and 2520-15.

Figure 26:
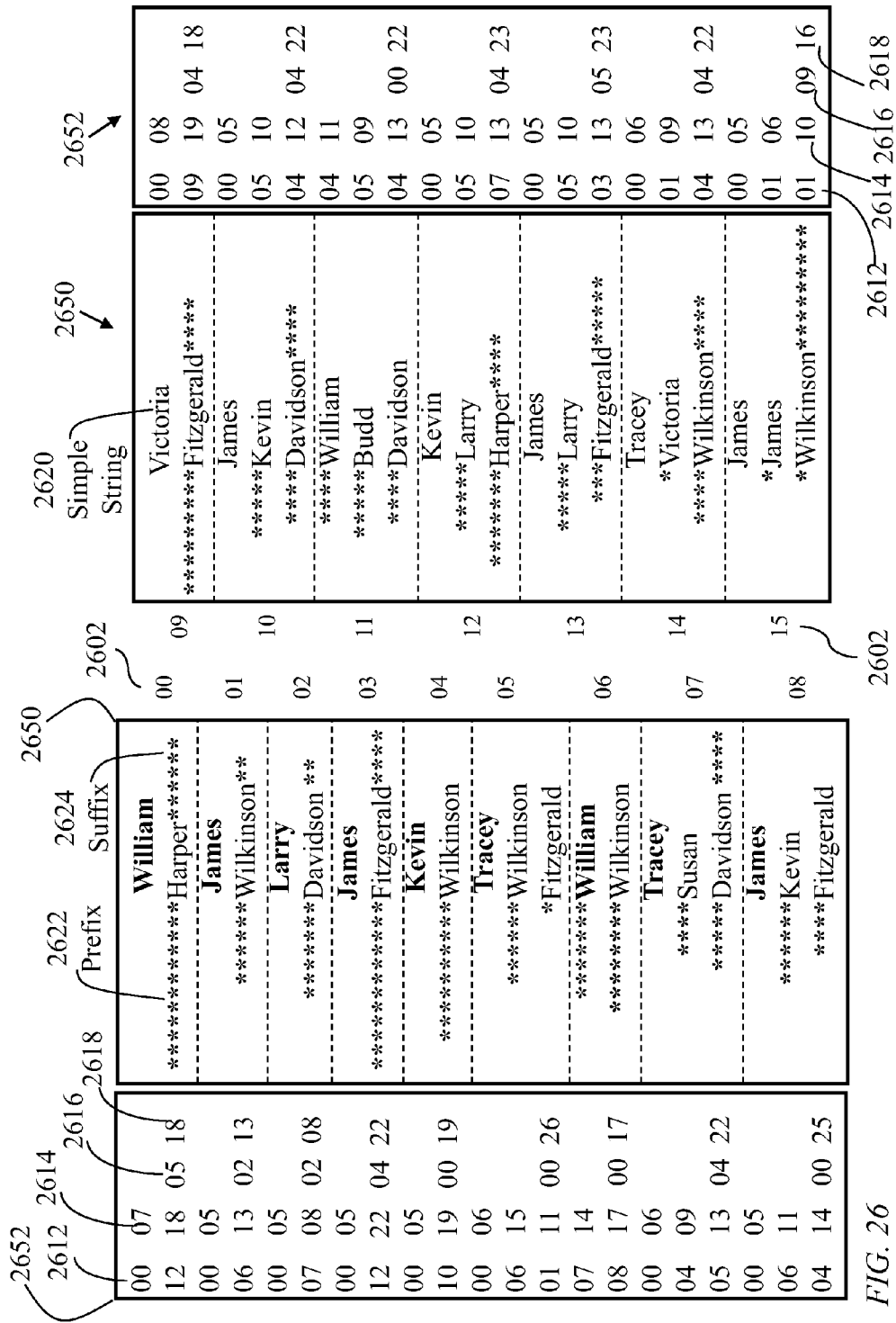
FIG. 26 illustrates a segmented dictionary and an associated segment-descriptor matrix derived from the complex dictionary of FIG. 25 according to an embodiment of the present invention.

FIG. 26 illustrates the process of segmenting complex dictionary 520 into a segmented dictionary 2650 and a segment-descriptor matrix 2652. Each entry in the segmented dictionary 2650 includes a string segment comprising a prefix 2622 (which can be a null prefix) and one simple string 2620. A last string segment of each complex string has an appended suffix 2624, which can be a null suffix. Each row in segment-descriptor matrix 2652 includes a field 2612 indicating a length of a prefix (which may be zero) and a field 2614 indicating a length of the corresponding string segment (which includes the length of the simple string of the string segment plus the length of its prefix). A row in segment-descriptor matrix 2652 corresponding to a last segment of a complex string further includes a field 2616 indicating a length of a suffix (which may be zero) and a field 2618 indicating a sum of lengths of string segments, excluding the first string segment, of a corresponding complex string. The content of field 2618 defines a corresponding bitmask.

FIGS. 27-28 illustrate a bitmask array 2754, comprising bitmasks 2740 for relating each string segment to its parent complex string. The bitmasks are of equal length. Examples of bitmasks 2740 are presented in FIGS. 12-16 where they are referenced as 1240 in FIGS. 12-14, 1540 in FIGS. 15, and 1640 in FIG. 16. FIGS. 27-28 illustrate bitmasks in their initial state, each being initialized as an opaque mask represented as a sequence of binary "0". To facilitate observation of state change, the bitmasks and the Boolean state variables in FIGS. 12-24 are illustrated as sequences of blank and hatched cells instead of sequences of binary "0" and "1".

Each bitmask corresponds to a string segment in the segmented dictionary 2650 and has a bit in a position corresponding to the end character of the string segment set to "true" (binary 1). The position is relative to the end character of the first simple string of the complex string.

Figure 29:
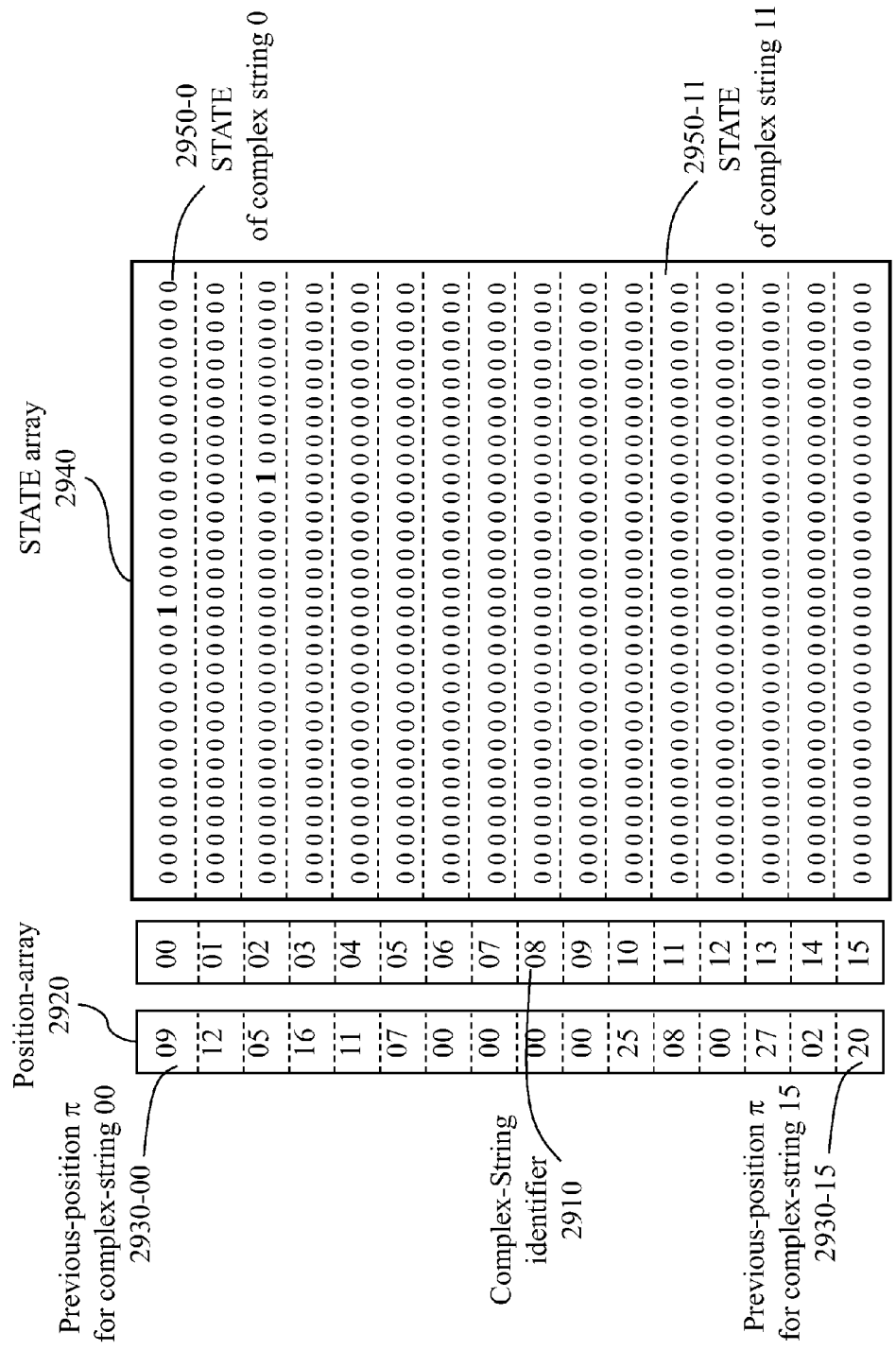
FIG. 29 illustrates a position array each element of which containing a preceding input-data position for a corresponding complex string in the complex dictionary of FIG. 26 and a STATE array each element of which being a Boolean variable of multiple bits indicating a search progress for a corresponding complex string in the complex dictionary of FIG. 25 for use in an embodiment of the present invention.

FIG. 29 illustrates a state-array 2940 having one Boolean state variable 2950 per complex string in the basic complex dictionary 520. The Boolean state variables 2950 are individually identified as 2950-0 to 2950-15, where the reference numeral 2950-*j* corresponds to a complex string 2510-*j* of the complex dictionary 520. A position array 2920 has an entry 2930-*j* indicating a last position of the input data at which a simple string belonging to complex string 2510-*j* was detected. The position array 2920 and the state array 2940 are used in the algorithm depicted in FIGS. 9-11.

The invention thus provides a computationally efficient method for screening a data stream to detect and locate complex strings belonging to a basic complex dictionary. The basic complex dictionary may comprise a very large number of complex strings, each including coherent strings and ambiguous strings. The method is partly based on establishing equality of coherent strings and congruence of ambiguous strings, where congruence of any two characters is based on their joint membership to one of predefined character classes.

The method is well adapted to software realization in a single-processor or multi-processor computing environments. The segmentation process of the basic complex dictionary into a segmented dictionary and associated segment descriptor and bitmasks, as illustrated in FIG. 7, is performed only when complex strings are added to, or deleted from, the basic complex dictionary. The process may, therefore, be implemented in a computing facility other than the computing facility used for executing the real-time processes of the string-search module 528 of FIG. 5, which is further detailed in FIG. 8.

Furthermore, in a multi-processor environment, the processes implemented by the two basic components 820 and 840 of the string-search module 528, may be pipelined to increase the rate at which complex strings can be detected and, hence, enable handling data streams of high flow rates.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. A system for detecting presence of complex strings in a data stream, the system comprising:
    a first memory device storing a complex dictionary containing a plurality of complex strings, each complex string comprising at least one ambiguous string and at least one coherent string, wherein a coherent string comprises a sequence of characters uniquely defined in an alphabet and an ambiguous string comprises characters defined according to a character-class association;
    a pre-processor and a respective memory device storing processor-readable instructions which cause said pre-processor to:
        parse said each complex string into string segments, each string segment comprising one ambiguous string and one coherent string;
        indicate lengths of said each string segment and said coherent string; and
        generate a bitmask indicating a location of each string segment within said each complex string;
    at least one primary processor and a respective memory device storing primary processor-readable instructions which cause said at least one primary processor to:
        identify successive coherent strings of a candidate complex string from said complex dictionary;
        locate sequential portions of said data stream that are identical to said successive coherent strings of said candidate complex string; and
        ascertain congruence of parts of said data stream interleaving said sequential portions with corresponding ambiguous strings of said candidate complex string interleaving said successive coherent strings;
    and
    at least one secondary processor, pipelined to said at least one primary processor, and a respective memory device storing secondary processor-readable instructions which cause said at least one secondary processor to:
        generate a multi-bit state variable indicating positions of said successive coherent strings; and
        correlate said multi-bit state variable with all bitmasks corresponding said candidate complex string.

2. The system of claim 1 further comprising an output processor, and a respective memory device storing processor-readable instructions causing said output processor to perform corrective actions upon detecting said candidate complex string, said corrective action including at least one of:
    marking said data stream; and
    deleting said candidate complex string from said data stream.

3. The system of claim 1 wherein said pre-processor is further configured to parse said each complex string into:
    a respective number of string segments, each string segment containing an ambiguous prefix of indefinite characters and a coherent string; and
    a last ambiguous suffix of indefinite characters following a last string segment of said each complex string.

4. The system of claim 1 wherein said pre-processor is further configured to parse said each complex string into:
    a respective number of string segments, each string segment containing a coherent string and an ambiguous suffix of indefinite characters; and
    a front ambiguous prefix of indefinite characters preceding a first string segment of said each complex string.

5. The system of claim 3 wherein said primary processor-readable instructions further cause said at least one primary processor to determine a number of coherent strings in said candidate complex string, each said coherent string preceded by a prefix of indefinite characters.

6. The system of claim 4 wherein said primary processor-readable instructions further cause said at least one primary processor to determine a number of coherent strings in said candidate complex string, each said coherent string succeeded by a suffix of indefinite characters.

7. The system of claim 5 wherein said secondary processor-readable instructions further cause said at least one secondary processor to:
    ascertain congruence of portions of said data stream preceding and interleaving said sequential portions to ambiguous prefixes of indefinite characters of said coherent strings; and ascertain congruence of said last ambiguous suffix of indefinite characters to a corresponding portion of said data stream following said sequential portions.

8. The system of claim 6 wherein said secondary processor-readable instructions further cause said at least one secondary processor to:
    ascertain congruence of portions of said data stream interleaving and succeeding said sequential portions to ambiguous suffixes of indefinite characters of said coherent strings; and
ascertain congruence of said front ambiguous prefix to a corresponding portion of said data stream preceding said sequential portions.

9. The system of claim 1 wherein said primary processor-readable instructions comprise an Aho-Corasick automaton.

10. The system of claim 1 wherein said primary processor-readable instructions implement a trie-based search method.

11. The system of claim 1 wherein said each complex string comprises an arbitrary number of interleaving coherent strings and ambiguous strings, wherein:
    each coherent string includes ordinary characters, each uniquely defined in an alphabet; and
    each ambiguous string includes indefinite characters, each indefinite character belonging to one of predefined classes, each class being defined by a corresponding subset of the alphabet.

12. The system of claim 11 further comprising
a second memory device storing segment descriptors indicating lengths of constituent string segments and corresponding coherent strings of said plurality of complex strings, wherein said segment descriptors are arranged in a matrix, each row of said matrix corresponding to a string segment of a respective complex string.

13. The system of claim 2 further comprising a buffer for retaining a data block of input data of said data stream, said data block to be modified by said output processor subject to detection of said candidate complex string.

14. A method for detecting presence of complex strings in a data stream, the method comprising:
    storing a complex dictionary containing a plurality of complex strings in a first memory device, each complex string comprising at least one ambiguous string and at least one coherent string, wherein a coherent string comprises a sequence of characters uniquely defined in an alphabet and an ambiguous string comprises characters defined according to a character-class association;
    organizing a plurality of processors, having respective memory devices storing respective processor-readable instructions, into:
        a pre-processor;
        at least one primary processor; and
        at least one secondary processor pipelined to said at least one primary processor;
    parsing said complex string into string segments, each string segment comprising one ambiguous string and one coherent string;
    indicating lengths of said each string segment and said coherent string; and
    generating a bitmask indicating a location of each string within said each complex string;
    at said at least one primary processor:
        identifying successive coherent strings of a candidate complex string selected from said complex dictionary;
        locating sequential portions of said data stream that are identical to said successive coherent strings of said candidate complex string; and
        ascertaining congruence of parts of said data stream interleaving said sequential portions with corresponding ambiguous strings of said candidate complex string interleaving said successive coherent strings;
    and
    at said at least one secondary processor:
        generating a multi-bit state variable indicating positions of said successive coherent strings; and
        correlating said multi-bit state variable with all bitmasks corresponding to said candidate complex string.

15. The method of claim 14 further comprising performing corrective actions upon detecting said candidate complex string using an output processor and a respective memory device storing respective processor-executable instructions, said corrective action including at least one of:
    marking said data stream; and
    deleting said candidate complex string from said data stream.

16. The method of claim 14 wherein said each complex string comprises an arbitrary number of interleaving coherent strings and ambiguous strings, and wherein:
    each coherent string includes ordinary characters, each uniquely defined in an alphabet; and
    each ambiguous string includes indefinite characters, each indefinite character belonging to one of predefined classes, each class being defined by a corresponding subset of the alphabet.

17. The method of claim 16 further comprising:
    storing segment descriptors indicating lengths of constituent string segments and corresponding coherent strings of said plurality of complex strings in a memory device; and
    arranging said segment descriptors in a matrix, each row of said matrix corresponding to a string segment of a respective complex string.

18. The method of claim 14 wherein said locating employs an Aho-Corasick automaton.

19. The method of claim 14 wherein said locating employs a trie-based search method.

* * * * *